US006253805B1

(12) United States Patent
Erwin et al.

(10) Patent No.: US 6,253,805 B1
(45) Date of Patent: Jul. 3, 2001

(54) APPARATUS AND IMPROVED METHOD FOR CHANGING AUTOMATIC TRANSMISSION FLUID IN MOTOR VEHICLES

(75) Inventors: Harold Edward Erwin; Michael Jason Erwin, both of Augusta; Craig James Dittmar, Wichita, all of KS (US)

(73) Assignee: BG Products, Inc., Wichita, KS (US)

( * ) Notice: Subject to any disclaimer, the term of this patent is extended or adjusted under 35 U.S.C. 154(b) by 0 days.

(21) Appl. No.: 09/537,129

(22) Filed: Mar. 29, 2000

Related U.S. Application Data

(60) Division of application No. 08/931,424, filed on Sep. 16, 1997, which is a continuation-in-part of application No. 08/778,581, filed on Jan. 3, 1997, now abandoned.

(51) Int. Cl.[7] .................................................. B65B 1/04
(52) U.S. Cl. ................ 141/98; 141/65; 141/59; 184/1.5
(58) Field of Search .............................. 141/98, 192, 65, 141/59, 85, 89; 184/1.5

(56) References Cited

U.S. PATENT DOCUMENTS

| | | |
|---|---|---|
| 3,513,941 | 5/1970 | Becnel . |
| 5,015,301 | 5/1991 | Baylor et al. . |
| 5,291,968 | 3/1994 | Brown . |
| 5,318,080 | 6/1994 | Viken . |
| 5,361,870 | 11/1994 | Courcy . |
| 5,370,160 | 12/1994 | Parker . |
| 5,427,202 | 6/1995 | Behring et al. . |
| 5,447,184 | 9/1995 | Betancourt . |
| 5,472,064 | 12/1995 | Viken . |
| 5,522,474 | 6/1996 | Burman . |

Primary Examiner—Steven O. Douglas
(74) Attorney, Agent, or Firm—Shook, Hardy & Bacon L.L.P.

(57) ABSTRACT

An apparatus for replacing transmission fluid in an automatic transmission. The apparatus comprises a tank separated into a pair of compartments by a bladder or diaphragm. At least one pressure regulator communicates with the tank. A vent valve assembly also communicates with the tank. A process for cleaning an automatic transmission and for replacing after cleaning used automatic transmission fluid in the automatic transmission with fresh automatic transmission fluid. The process includes flowing fresh ATF into a first compartment of a tank and into a pliable tub or bladder member in communication with the first compartment until the pliable tub or bladder member and the first compartment are filled with a volume of fresh ATF. A chemical cleaning compound is disposed in the used ATF of the automatic transmission and is circulated through the automatic transmission and its associated components to clean the same and produce contaminated used ATF. The process additionally includes flowing the contaminated used ATF from the automatic transmission into a second compartment in communication with the pliable tub or bladder member, causing the fresh ATF to flow from the first compartment and from the pliable tub member into the automatic transmission. The pressure of the flowing contaminated used ATF is regulated.

11 Claims, 30 Drawing Sheets

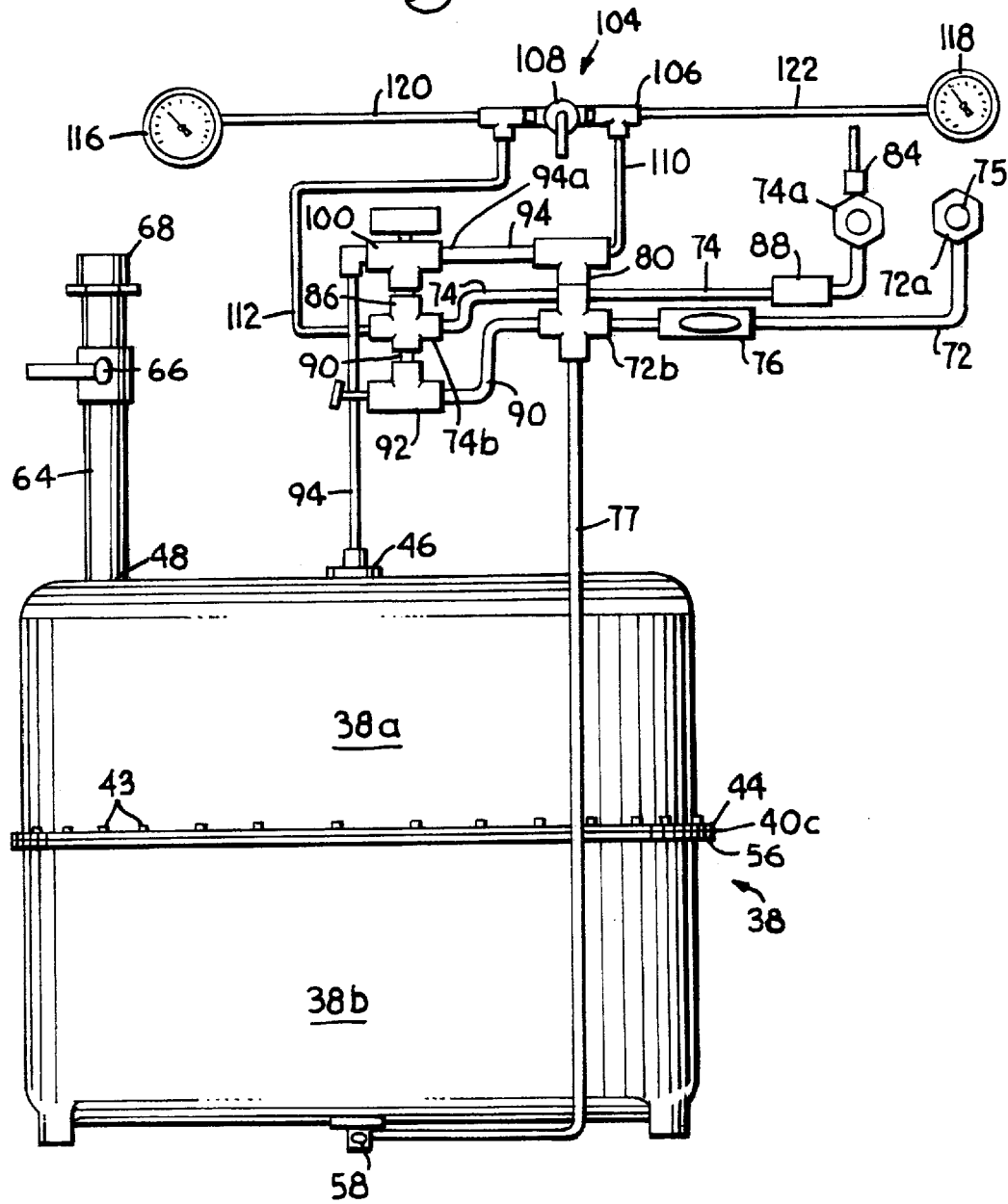

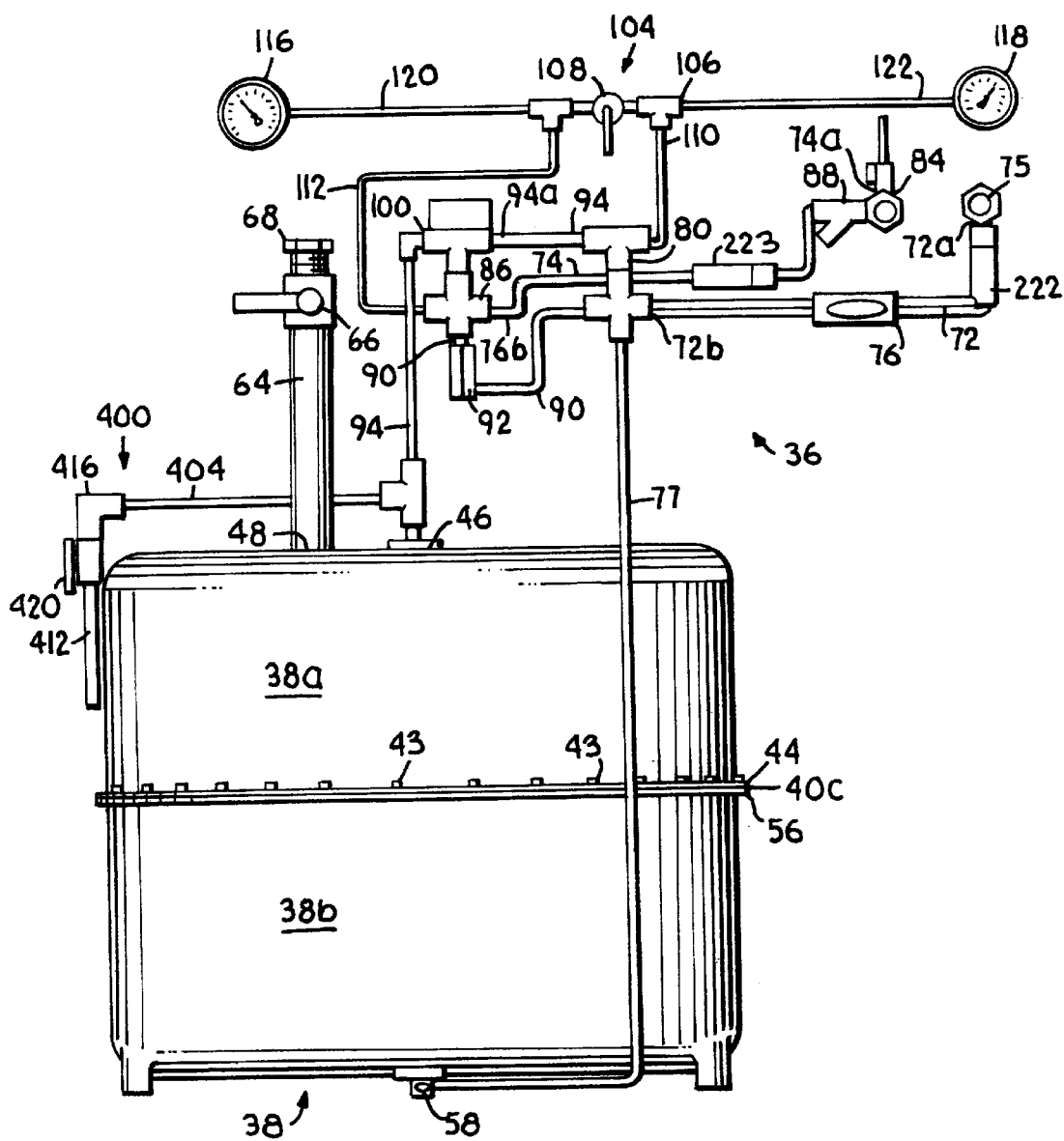

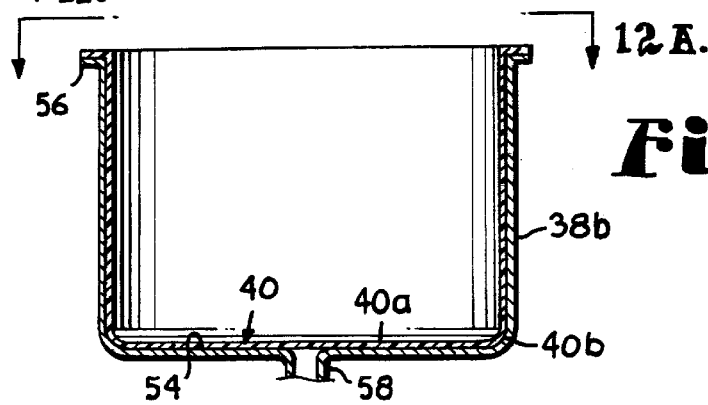
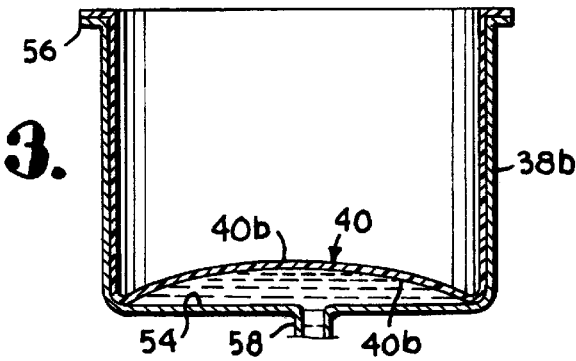
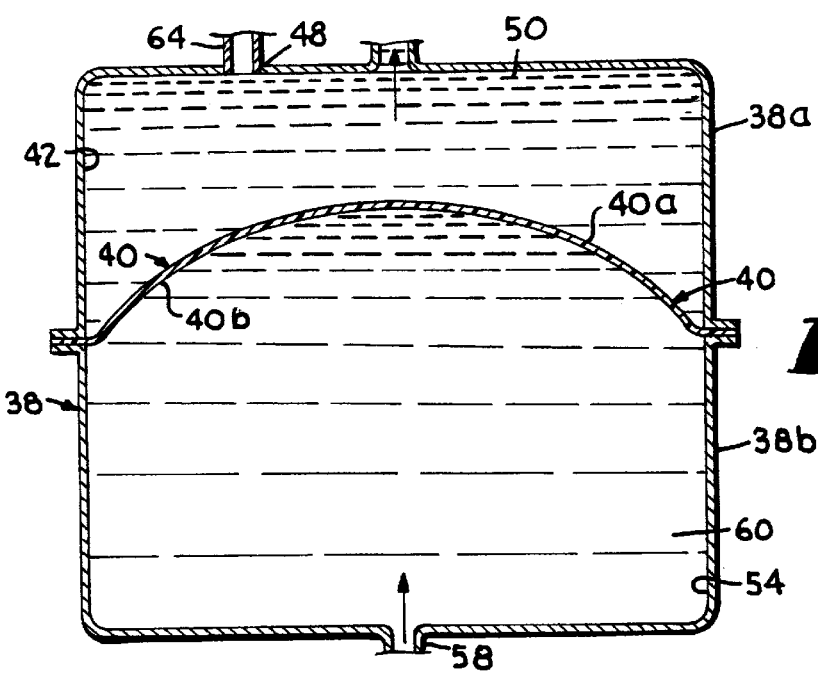

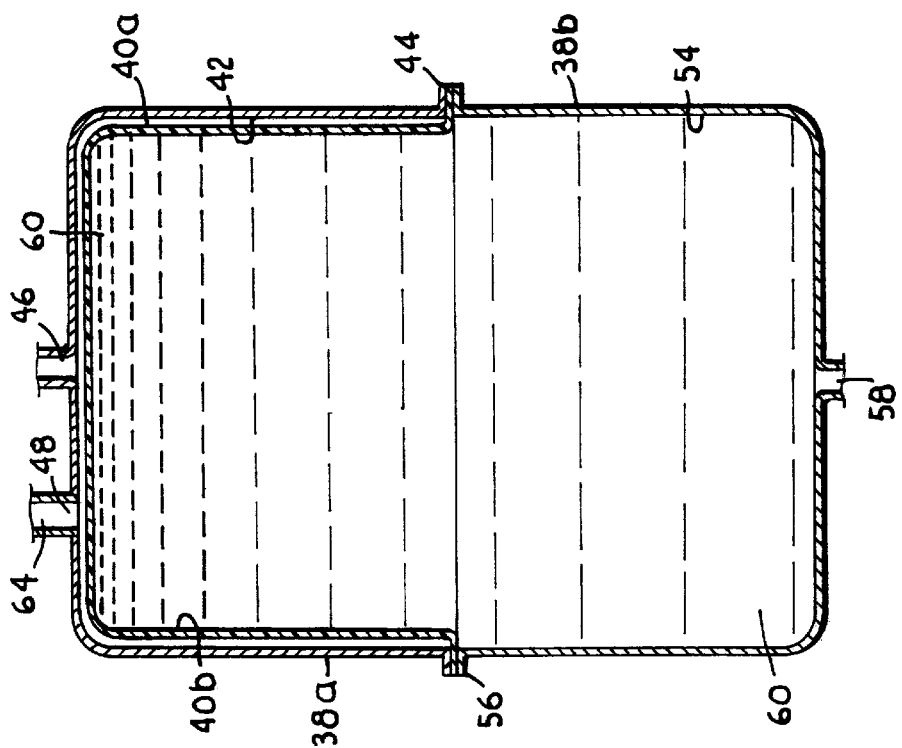
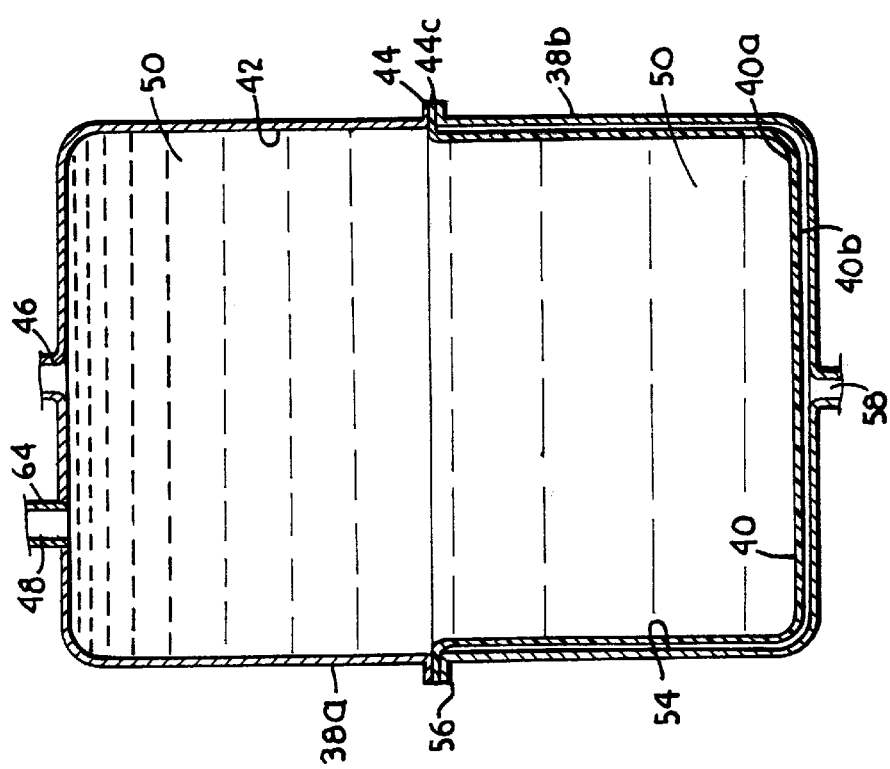

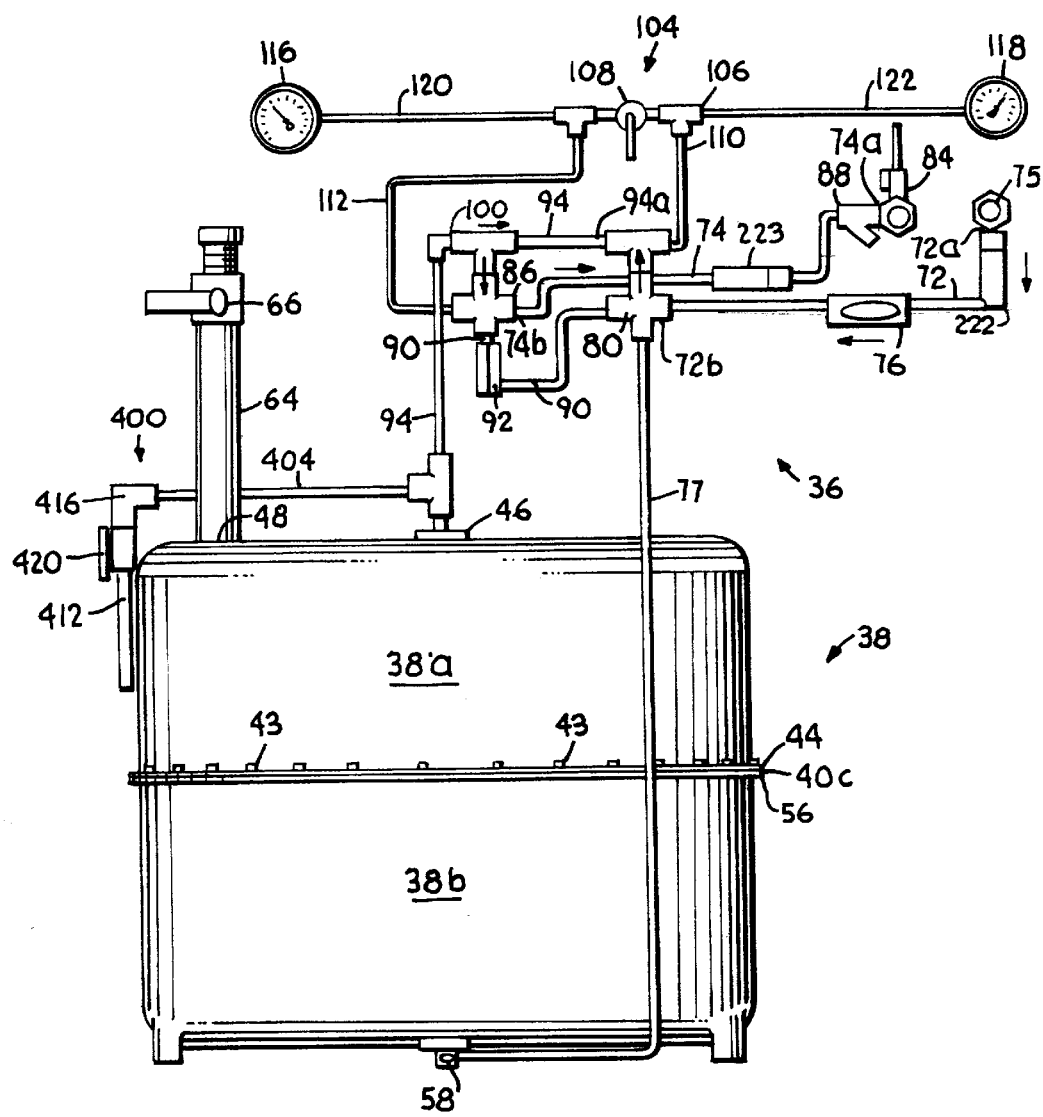

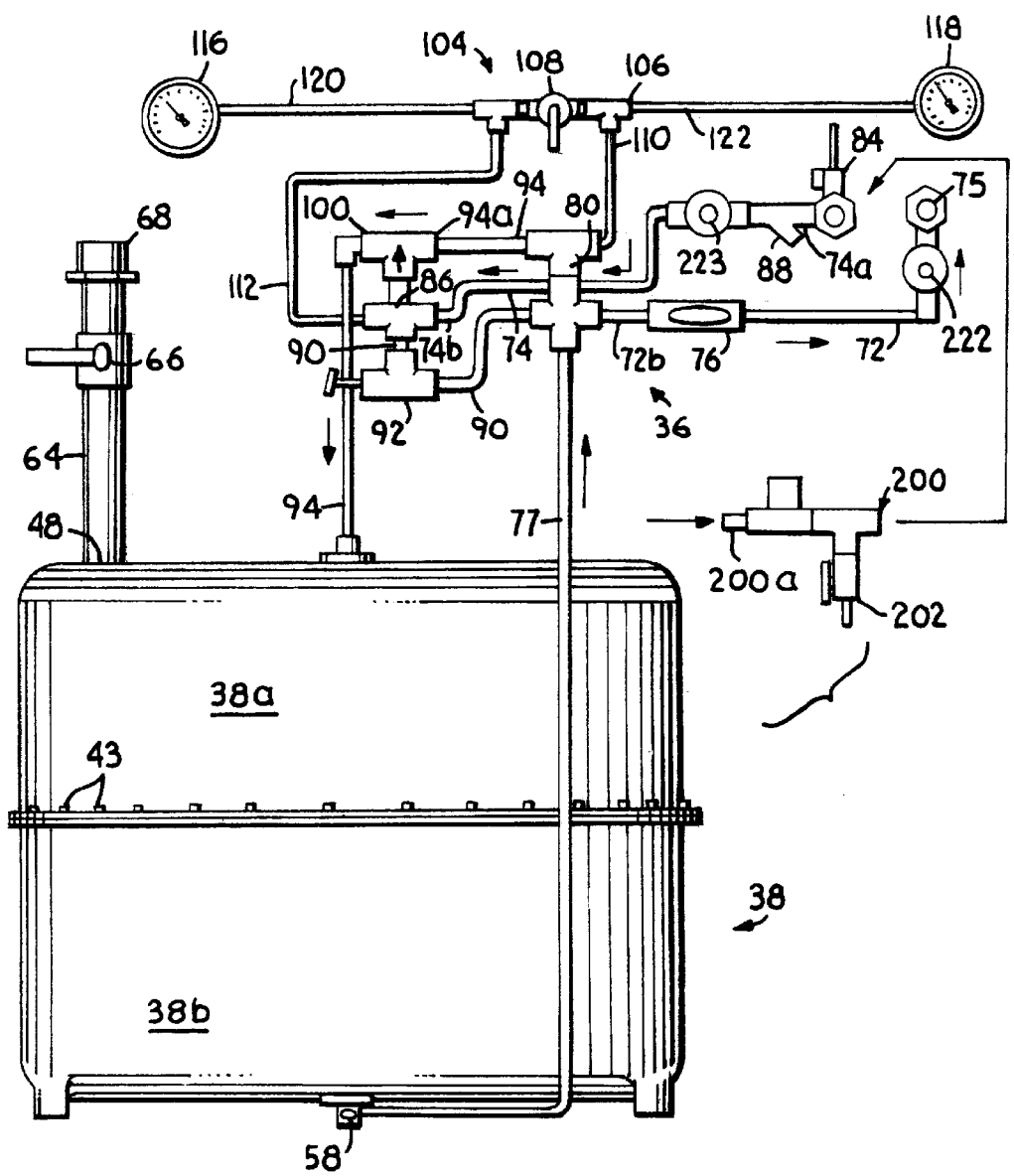

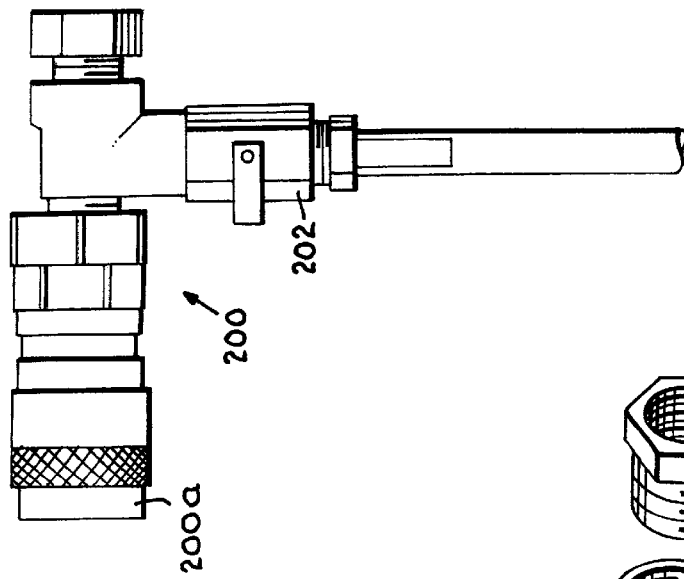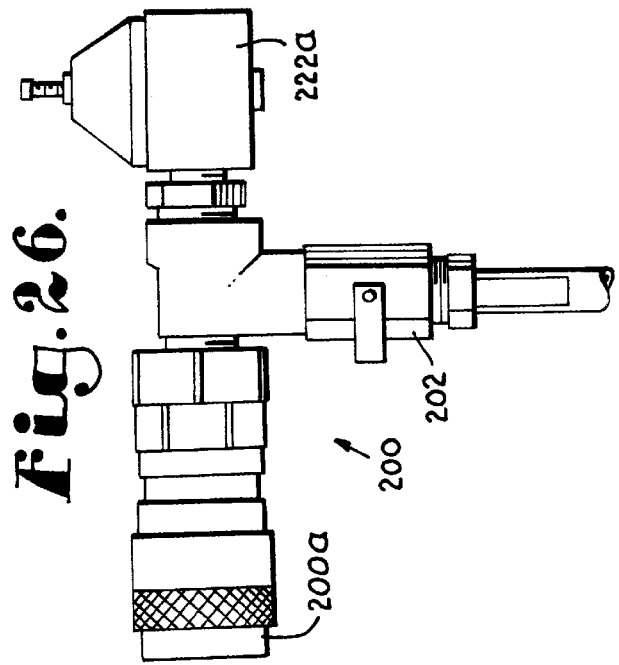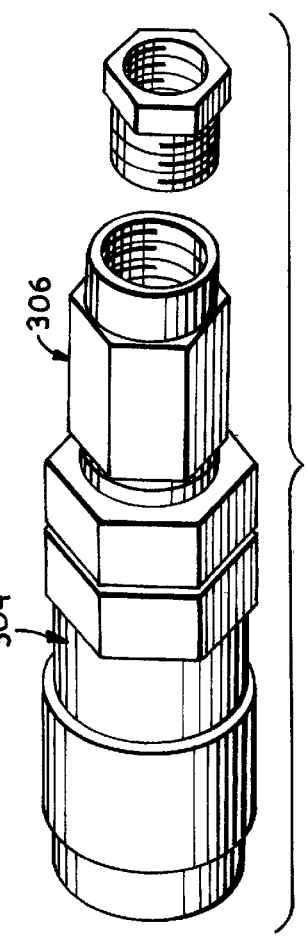

APPARATUS AND IMPROVED METHOD FOR CHANGING AUTOMATIC TRANSMISSION FLUID IN MOTOR VEHICLES

This is a division of Ser. No. 08/931,424 filed Sept. 16, 1997, which is a continuation-in-part patent application of copending patent application Ser. No. 08/778,581, filed Jan. 3, 1997 now abandoned. Benefit of the earlier Jan. 3, 1997, filing date with respect to all common subject matter is hereby claimed.

BACKGROUND OF THE INVENTION

1. Field of the Invention

The present invention relates to changing automatic transmission fluid (AFT) in a motor vehicle. More specifically, the present invention provides for an apparatus and method for replacing automatic transmission fluid in an automatic transmission in a motor vehicle.

2. Description of the Prior Art

Many consumer and industrial devices today use automatic transmissions filled with automatic transmission fluid (ATF) as the working fluid. To maintain the integrity of an automatic transmission in a motor vehicle, automatic transmission fluid should be periodically removed from the automatic transmission and replenished with fresh automatic transmission fluid; especially since transmission fluid properties deteriorate with mileage of the motor vehicle because of heat and pressure of the motor engine. As an automatic transmission wears with time, minute particles of metal and the like, as well as carbon and similar substances from various materials in the automatic transmission, mix with the automatic transmission fluid and form deposits.

Associated components of an automatic transmission include the valve body assembly, the torque converter, external and internal automatic transmission fluid passages and lines and the automatic transmission cooler. More often in late model vehicles, these associated components are being subjected to severe heating and cooling cycles. The components are smaller in size, have less surface area, and are packed into tight areas that are spaced from the primary air flow, often very close to vehicle exhaust systems including hot catalytic converters. In addition, cooling systems are purposely maintained at higher than ever temperatures to improve engine combustion efficiency. These cooling systems are the primary source of automatic transmission fluid cooling. As previously indicated, the result of these conditions on today's automatic transmission and its associated components, is the formation of deposits throughout the system.

These deposits are primarily the result of metallic particulates and oxidized ATF. They require a chemical cleaner for cleaning purposes because they cannot be removed just by exchanging or transfusing the automatic transmission fluid. Oxidation is a normal degradation process on petroleum based oils. However, continuous heating and cooling to the extremes, as seen today, will greatly expedite this oxidation process. These deposits will form in critical areas such as in the valve body of the transmission where gear shifting is controlled, as well as in automatic transmission fluid lines and in automatic transmission fluid coolers. Many original equipment manufactures of the motor vehicles now recommend flushing of the automatic transmission fluid lines and coolers to remove the deposit build up. The deposits are coating lines and coolers, thus restricting fluid flow and proper heat transfer for cooling. If automobile and truck automatic transmission fluid changes are not made at the designated periods, slippage of the automatic transmission may occur and, eventually, the transmission fails.

When automatic transmission fluid is drained at recommended periods from a transmission case, the used transmission fluid will typically be found to be dark, indicating contaminants in the transmission fluid. Furthermore, the transmission fluid present in the transmission case is only a small portion of the transmission fluid actually in the automatic transmission, as a large quantity of the transmission fluid remains in the torque converter, the transmission fluid cooler, and in other control circuits and components of the automatic transmission. It has been estimated that 50% or more of the transmission fluid is not, removed by draining only the transmission case. Thus, after the traditional method of changing automatic transmission fluid, a significant portion of the transmission fluid still contains contaminants because after the traditional transmission fluid change, the quantity of contaminants in an automatic transmission and its associated components will accumulate with successive fluid changes, especially since the transmission will be forced to operate with a mixture of used or old transmission fluid and new or fresh transmission fluid. Such operation will reduce the efficiency and life of the automotive transmission.

These problems have been recognized by the prior art. U.S. Pat. No. 5,291,968 to Brown teaches a drain pan under a transmission, and the collecting of transmission fluid in the drain pan for disposal. Brown then uses an external pump to force new transmission fluid from a reservoir into an outlet of the transmission. The engine is subsequently used to pump the remainder of the used fluid out as the fresh fluid is pumped in. Brown notes that simply removing the transmission pan allows only about three quarts of fluid to be drained of a transmission fluid capacity of twelve quarts.

U.S. Pat. No. 5,318,080 to Viken teaches a fluid receiver for used transmission fluid, a source of supply of fresh transmission fluid, and a pneumatic cushion for coordinating the introduction of fresh fluid into a transmission with the draining of used transmission fluid therefrom. More particularly, the pneumatic cushion is provided intermediate individual receptacles for receiving used transmission fluid and adding new transmission fluid while pressure within the receptacles is maintained at a predetermined level commensurate with the normal operating pressure of the fluid in a given transmission.

U.S. Pat. No. 5,361,870 to Courcy discloses a transmission fluid exchange apparatus comprising a tank structure arranged to include a piston within the tank structure to divide the tank into a first and second chamber. A piston rod is fixedly and coaxially mounted to the piston and extends through the second chamber and into the exterior of the tank. The first chamber is arranged to receive used transmission fluid while simultaneously fresh transmission fluid is directed from the second chamber into an associated transmission line. The piston rod has rod graduations along an exterior surface thereof for indicating various incremental fluid directed from the tank.

U.S. Pat. No. 5,427,202 to Behring et al. discloses an apparatus to flush transmission fluid from a vehicle. The vehicle has a transmission fluid cooler with a first line extending from a transmission to the cooler to carry transmission fluid to the cooler and a second line from the cooler to the transmission to carry cooled transmission fluid back to the transmission. The apparatus comprises of a storage tank and a means to connect one of the lines to the storage tank to direct the old or used automatic transmission fluid flowing through the line into the storage tank. A supply tank is provided with replacement automatic transmission fluid therein. A filling apparatus is connected to the supply tank and into the automatic transmission dipstick tube to continuously supply fresh replacement automatic transmission fluid to the automatic transmission simultaneously with the used automatic transmission flowing to the storage tank.

U.S. Pat. No. 5,447,184 to Betancourt teaches a flushing system that thoroughly flushes out a transmission in a single sitting, purging it while running, and flushing through a volume of oil equal to 3 to 5 times the fluid capacity of the transmission to ensure the complete replacement of all fluid in all ports and passageways. Betancourt indicates that an important feature of his system enables the operator to ascertain the normal flow direction of the fluid in the transmission cooling system under action of the vehicle's pump. Once the operator determines the normal flow direction of the fluid, if the lines of the purging system turn out to be reversed, they can be switched with a valve without having to remove and switch the hose connections between the transmission and the flushing system. Betancourt also discloses a means to monitor and control flow rates into and out of the transmission so that the fluid level remains stable.

U.S. Pat. No. 5,472,064 to Viken discloses a total fluid exchange system for automatic transmissions. Regulated compressed air provides pressure to deliver fresh fluid to the automatic transmission. Viken provides for various valves, gates, pressure, and other indicator or control elements to maintain proper directed fluid flow. A pair of position valves allows for either straight through flow or reversal flow between two lines which carry used and fresh fluid to and from the opened cooling circuit. Viken also provides for an electronic system with a microprocessor and a control panel for entering simple on/off commands and for indicating the status of key function. A printer is provided to produce a written record of the service by specifying pressure, rate of flow before and after clarity of fluid, and the total number of quarts of fresh fluid used. The microprocessor is taught as being able to control all system functions either automatically or semi-automatically.

U.S. Pat. No. 5,522,474 to Burman discloses an apparatus for removing automatic transmission fluid from an automatic transmission. A cylindrical reservoir is provided. The reservoir has an inlet fitting at one end and an outlet fitting at the other end. A pair of flexible lines is respectively connected to the inlet fitting and the outlet fitting. The cylindrical reservoir has a floating piston that can freely move therein.

The instant invention attempts to overcome deficiencies of the foregoing prior art by providing for a simple, cost effective apparatus and method that completely flushes and cleans the entire transmission and replaces the transmission fluid. The apparatus and method of the present invention overcome disadvantages of the prior art and satisfy the need for an improved concept for cleaning a transmission and its associated components and for changing automatic transmission fluid.

SUMMARY OF THE INVENTION

The present invention accomplishes its desired objects by broadly providing an apparatus for replacing transmission fluid in an automatic transmission comprising a container having an internal wall and including a structure defining a first port and a second port. A separator member is engaged to the internal wall of the container to separate the first port from the second port and to internally divide the internal wall of the container into a first internal wall with a first internal wall area and a second internal wall with a second internal wall area. The separator member has a first peripheral surface with a first peripheral surface area that is at least about essentially equal to the first internal wall area of the first internal wall. The separator member includes a second peripheral surface with a second peripheral surface area that is at least about essentially equal to the second internal wall area of the second internal wall. A first pressure regulator communicates with the first port, and a second pressure regulator communicates with the second port. A vent valve assembly communicates with the first port.

The present invention also accomplishes its desired objects by broadly providing an apparatus for replacing transmission fluid in an automatic transmission. The apparatus comprises a first container member having a first internal wall with a first internal wall area and terminating in a first perimeter and including a structure defining a first port. A separator member is provided having a first peripheral surface with a first peripheral surface area that is at least about essentially equal to the first internal wall area of the first internal wall of the first container member and including a perimeter engaged to the first perimeter of the first container member. The apparatus further comprises a second container member having a second internal wall with a second internal wall area and terminating in a second perimeter engaged to the separator of the separator member and including a structure defining a second port. The separator member is preferably an essentially non-elastic separator member formed of essentially non-elastic material (i.e. non-rubber material). The second perimeter of the second container member is engaged to the first perimeter of the first container member such that the perimeter of the essentially non-elastic separator member is sandwiched between the first perimeter and the second perimeter. The separator member includes a second peripheral surface with a second peripheral surface area that is at least about essentially equal to the second internal wall area of the second internal wall of the second container member.

The present invention further also accomplishes its desired objects by broadly providing an apparatus for replacing transmission fluid in an automatic transmission comprising a first container member having a first internal wall with a first internal wall area and terminating in a first perimeter and including a structure defining a first port; and a tub member having a first peripheral surface with a first peripheral surface area that is at least about essentially equal to said first internal wall area of the first internal wall of the first container member. The tub member includes a perimeter engaged to the first perimeter of the first container member such that the first internal wall of the first container member is capable of contacting the first peripheral surface of the tub member for supporting the tub member. The apparatus further comprises a second container member having a second internal wall with a second internal wall area and terminating in a second perimeter engaged to the perimeter of the tub member and including a structure defining a second port. The tub member comprises essentially non-stretchable pliable material and includes a second peripheral surface with a second peripheral surface area that is at least about essentially equal to the second internal wall area of the second internal wall of said second container member.

The present invention further still also accomplishes its desired objects by broadly providing a process for cleaning an automatic transmission and for replacing after cleaning contaminated used transmission fluid in the automatic transmission with fresh automatic transmission fluid comprising the steps of:

a) flowing fresh automatic transmission fluid into a first container member and into a pliable tub member in communication with the first container member until the pliable tub member and the first container member are filled with a volume of fresh automatic transmission fluid;

b) disposing a chemical cleaning compound in an automatic transmission containing used automatic transmission fluid;

c) circulating the chemical cleaning compound of step (b) through the automatic transmission to clean the automatic transmission and produce contaminated used automatic transmission fluid;

d) flowing with or under a pressure the contaminated used automatic transmission fluid of step (c) from the automatic transmission into a second container member in communication with the pliable tub member of step (a), causing the fresh automatic transmission fluid of step (a) to flow from the first container member and from the pliable tub member into the automatic transmission; and e) regulating the pressure of the flowing step (d) to ensure that the flowing contaminated used automatic transmission fluid does not exceed a prescribed pressure.

The flowing of step (d) continues until the second container member and the pliable tub member are filled with a volume of contaminated used automatic transmission fluid and the automatic transmission contains the fresh automatic transmission fluid. The process additionally comprises removing fresh automatic transmission fluid from the automatic transmission; flowing the removed fresh automatic transmission fluid through a bypass member; and recycling the removed fresh automatic transmission fluid back into the automatic transmission. The volume of fresh automatic transmission of step (a) is approximately equal to the volume of contaminated used automatic transmission fluid. The chemical cleaning compound comprises a solvent, a fatty acid, and a naphthenic hydrocarbon. More, particularly, the chemical cleaning compound comprises from about 1.0% by wt. to about 10.0% by wt. 2-methyl-1-pentanol; from about 1.0% by wt. to about 10.0% by wt. cis-9-octadecenoic acid; and from about 70.0% by wt. to about 98.0% by wt. of a naphthenic hydrocarbon.

The present invention further provides for a process for replacing used transmission fluid in an automatic transmission with fresh automatic transmission fluid comprising the steps of:

a) flowing used automatic transmission fluid from an automatic transmission into a container member, causing fresh automatic transmission fluid to flow from the container member into the automatic transmission;

b) removing fresh automatic transmission fluid from the automatic transmission to produce removed fresh automatic transmission fluid;

c) flowing the removed fresh automatic transmission fluid of step (b) through a bypass member; and d) recycling the removed fresh automatic transmission fluid back into the automatic transmission.

The flowing step (a) comprises regulating the pressure of the flowing used automatic transmission fluid such that the pressure does not exceed a prescribed pressure, and moving a pliable tub member from a first position of being essentially flushed against a first internal wall of the container member to a second position of being essentially flushed against a second internal wall of the container member.

The present invention further accomplishes its desired objects by broadly providing a process for removing used automatic transmission fluid from an automatic transmission and replacing in the automatic transmission the removed used transmission fluid with fresh automatic transmission fluid comprising the steps of:

a) providing a container member having a first chamber with a first internal wall and a second chamber with a second internal wall and including a pliable tub member with a first tub side and with a second tub side and disposed in the container member such as to separate the first chamber from the second chamber;

b) disposing fresh automatic transmission fluid in the first chamber of the container member such that the second tub side of the pliable tub member becomes essentially flushed against the second internal wall of the second chamber;

c) flowing used automatic transmission fluid from an automatic transmission through a pressure regulator and into the second chamber of the container member, causing fresh automatic transmission fluid to flow out of the first chamber and into the automatic transmission as the second tub side of the pliable tub member moves away from the second internal wall of the second chamber; and d) continuing the flowing step (c) until the first tub side of the tub member becomes essentially flushed against the first internal wall of the first chamber.

It is therefore an object of the present invention to provide an apparatus for replacing transmission fluid in an automatic transmission.

It is another object of the present invention to provide a process for cleaning an automatic transmission and for replacing used automatic transmission fluid in the automatic transmission with fresh automatic transmission fluid.

These, together with the various ancillary objects and features which will become apparent to those skilled in the art as the following description proceeds, are attained by this novel apparatus and method, a preferred embodiment thereof shown with reference to the accompanying drawings, by way of example only, wherein:

BRIEF DESCRIPTION OF THE DRAWINGS

FIG. 10A is a schematic view of the conduit and control assembly;

FIG. 10B is a schematic view of the conduit and control assembly of FIG. 10A including a pair of safety (pressure) regulators and a vent valve assembly;

FIG. 12 is a vertical sectional view of the lower compartment of the tank having a the bladder essentially flush against the inside wall thereof;

FIG. 13 is a vertical sectional view of the lower compartment of the tank and a bladder wherein the outside surface area of the bladder is greater than the inside surface area of the lower compartment such that the bladder does not essentially flush against the inside surface of the lower compartment;

FIG. 14 is a vertical sectional view of the tank having used ATF flowing into the lower compartment thereof and having new ATF being expelled from the upper compartment thereof, with the bladder separating the used ATF and the new ATF with the movement of the bladder being controlled by the incoming used ATF and the outgoing new ATF;

FIG. 15 is a vertical sectional view of the tank filled with new ATF and having the bladder member essentially flushed against the inside wall of the lower compartment of the tank;

FIG. 16 is a vertical sectional view of the tank full of used ATF with the bladder being essentially flushed against the inside wall of the upper compartment of the tank;

FIG. 17B is a schematic diagram of the conduit and control assembly of FIG. 17A including a pair of safety (pressure) regulators and a vent valve assembly;

FIG. 25A is a schematic diagram of the conduit and control assembly of the embodiment of the invention illustrated in FIG. 22A with the arrows representing the flow circuit in a "recharge" mode with a pressurized new ATF supply;

FIG. 26 is a side elevational view of one embodiment of the recharge adapter with a safety (pressure) regulator;

FIG. 27 is a side elevational view of the recharge adapter of FIG. 26, but without the safety (pressure) regulator;

FIG. 28 is a perspective view of another embodiment of the recharge adapter including a female hydraulic coupler and a check or back pressure valve;

DETAILED DESCRIPTION OF THE INVENTION

Figure 1A:
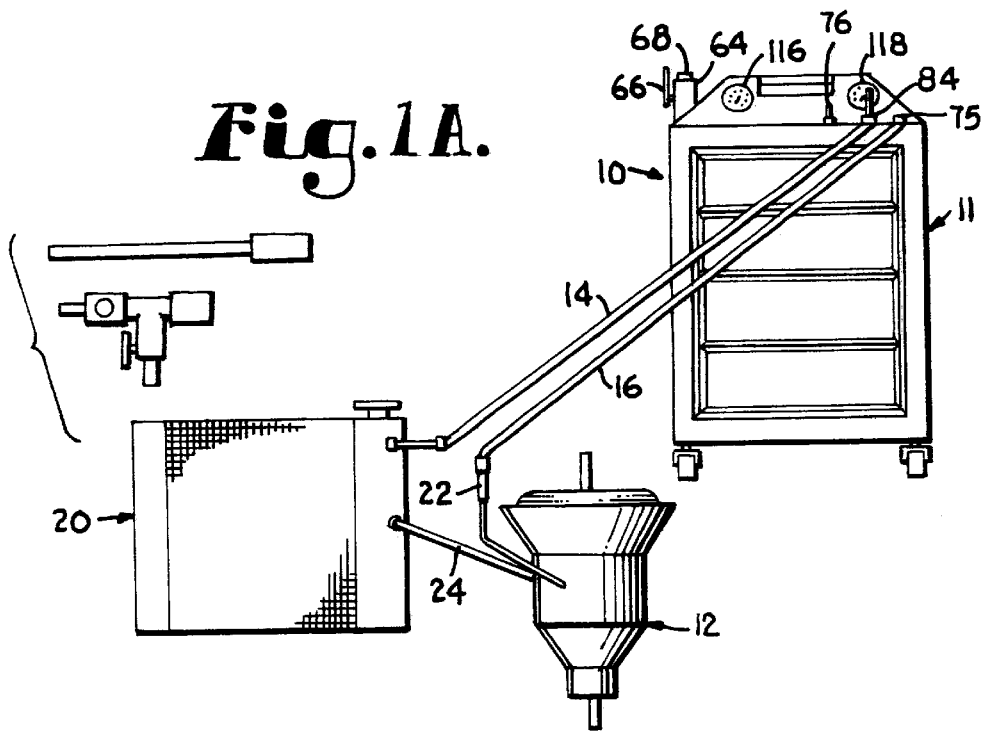
FIG. 1A is a schematic diagram of the apparatus of the present invention hooked up to a radiator and to an automatic transmission.

Referring in detail now to the drawings wherein similar parts of the present invention are identified by like reference numerals, there is seen an apparatus, generally illustrated as 10 (see FIGS. 1A and 1B), for replacing automatic transmission fluid (ATF) in an automatic transmission generally illustrated as 12. The apparatus 10 includes a cabinet 11 and has a pair of hoses 14 and 16 connected thereto and extending therefrom to any number of possible accessible points along an automatic transmission fluid (ATF) route, generally illustrated as 18 in FIG. 2. As particularly shown in FIG. 2, the ATF route 18 includes a radiator, generally illustrated as 20, having a pair of conduits 22 and 24 connected thereto and respectively extending to an external cooler, generally illustrated as 28, and to the transmission 12. The ATF route 18 also includes a conduit 30 extending between the transmission 12 and the external cooler 28 and has an external filter 32 disposed within conduit 30 for filtering fluid passing between the external cooler 28 and the transmission 12.

Figure 1B:
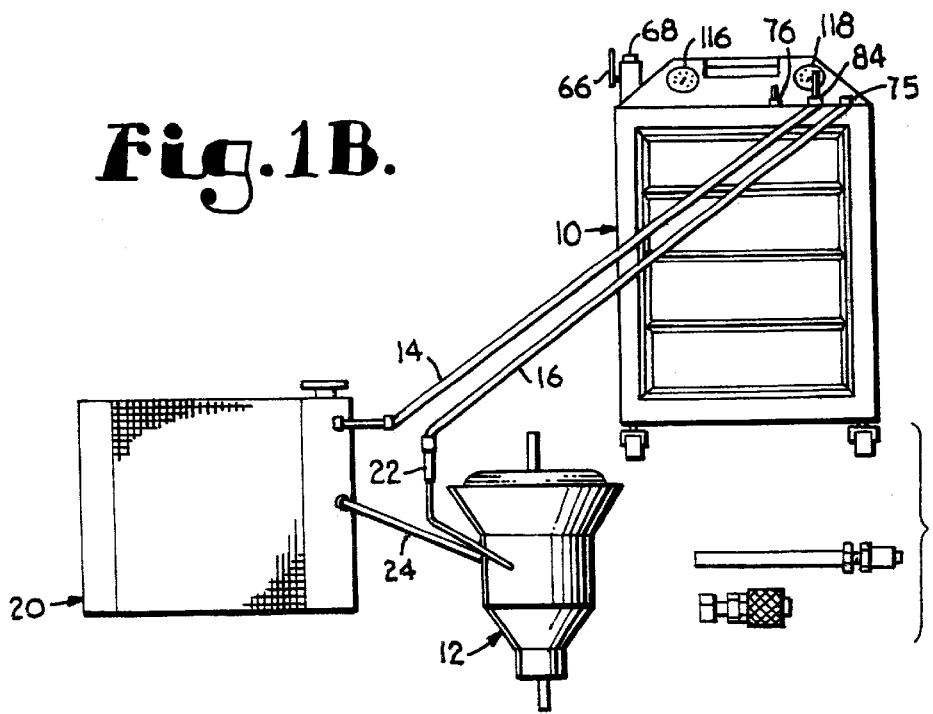
FIG. 1B is another schematic diagram of the apparatus of the present invention hooked up to a radiator and to an automatic transmission.
Figure 2:
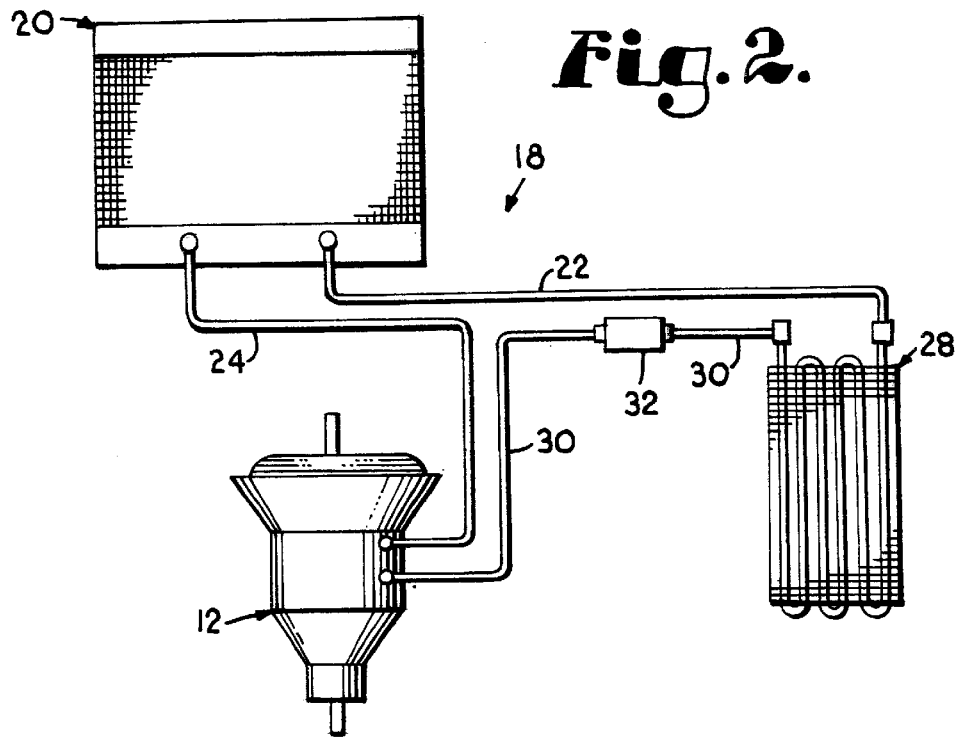
FIG. 2 is a schematic diagram of accessible points along an automatic transmission fluid (ATF) route.
Figure 3:
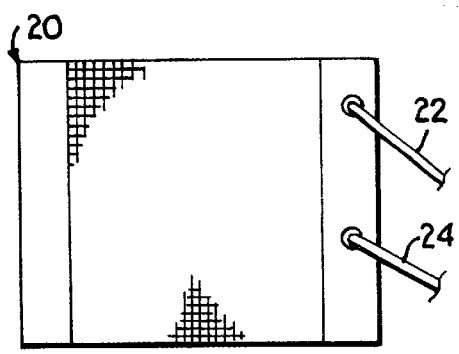
FIG. 3 is a front elevational view of a crossflow radiator with the cooler on one side and engaged to a pair of hoses, either of which is to be coupled to the apparatus of the present invention.
Figure 4:
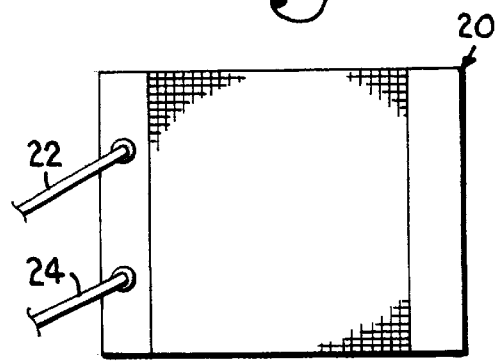
FIG. 4 is a front elevational view of a crossflow radiator with the cooler on the opposite side of the crossflow radiator in FIG. 3 and engaged with a pair of hoses, either of which is to be coupled to the apparatus of the present invention.
Figure 5:
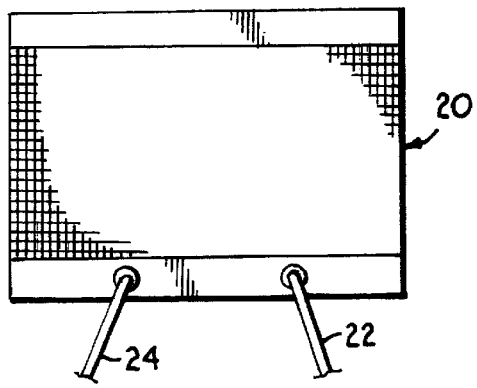
FIG. 5 is a front elevational view of a top tank with the cooler on the bottom and with a pair of hoses engaged to the cooler.
Figure 6:
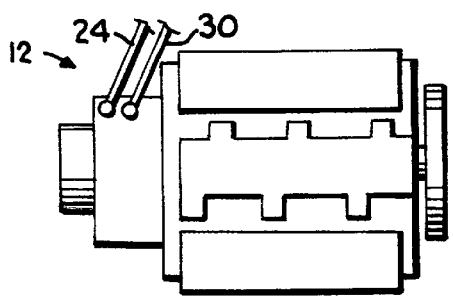
FIG. 6 is a front elevational view of an automatic transmission for front wheel drive and including a pair of hoses engaged thereto.
Figure 7:
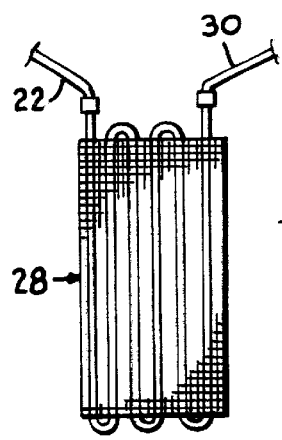
FIG. 7 is a front elevation view of an external cooler and having a pair of hoses engaged thereto.
Figure 8:
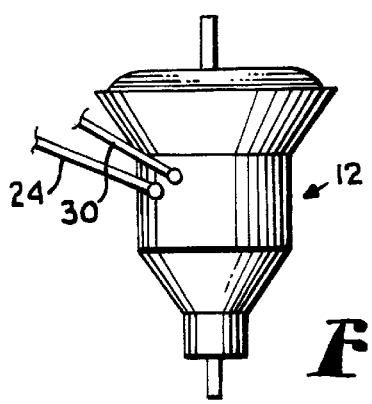
FIG. 8 is a top plan view of an automatic transmission for rear wheel drive and including a pair of hoses connected thereto and wherein the hoses from the apparatus of the present invention will be connected to the connections of either one of these hoses.
Figure 9:
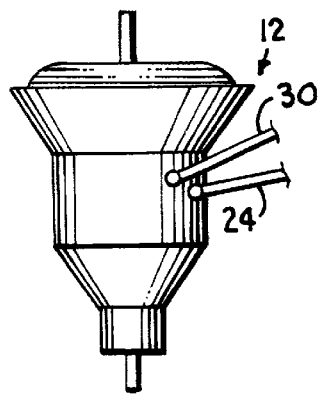
FIG. 9 is a top plan view of the automatic transmission for rear wheel drive of FIG. 8 but with the hoses of FIG. 8 engaged to an opposite side thereof.

The possible accessible points along the ATF route 18 where conduits 22 and/or 24 and/or 30 could connect would include the radiator 20 (see FIGS. 3–5), the transmission 12 (see FIGS. 6, 8 and 9), and the external cooler 28 (see FIG. 7). If the radiator 20 is of the cross flow type with a cooler on a side, the conduits 22 and 24 would connect to a side of the radiator 20, as best shown in FIGS. 1A and 1B. If the radiator 20 is the top tank type, the conduits 22 and 24 would connect at the bottom (see FIG. 5) of the radiator 20. The conduits 24 and 30 could be employed with any type of automatic transmission, such as connecting to the transmission 12 for a rear wheel drive (see FIGS. 8 and 9) or to the transmission 12 for a front wheel drive (see FIG. 6). It is apparent to those possessing ordinary skill in the art that hose 14 or hose 16 could be replaced by conduit 24 or conduit 22 or conduit 30. Therefore, it would only be necessary to disconnect conduit 24 or conduit 22 or conduit 30 and secure the disconnected conduit to the apparatus 10 and connect either hose 14 or hose 16 (depending on which one is to be used) to the situs where the conduit (i.e. conduit 24 or conduit 22 or conduit 30) was disconnected. There are numerous ways of employing hoses 14 and 16 with conduits 22, 24 and 30, none of which are to limit the scope of the present invention. Thus, the employment of the apparatus 10 within the ATF route 18 may be in any suitable manner, all readily discernible to those skilled in the art and all within the spirit and scope of the present invention.

Figure 17A:
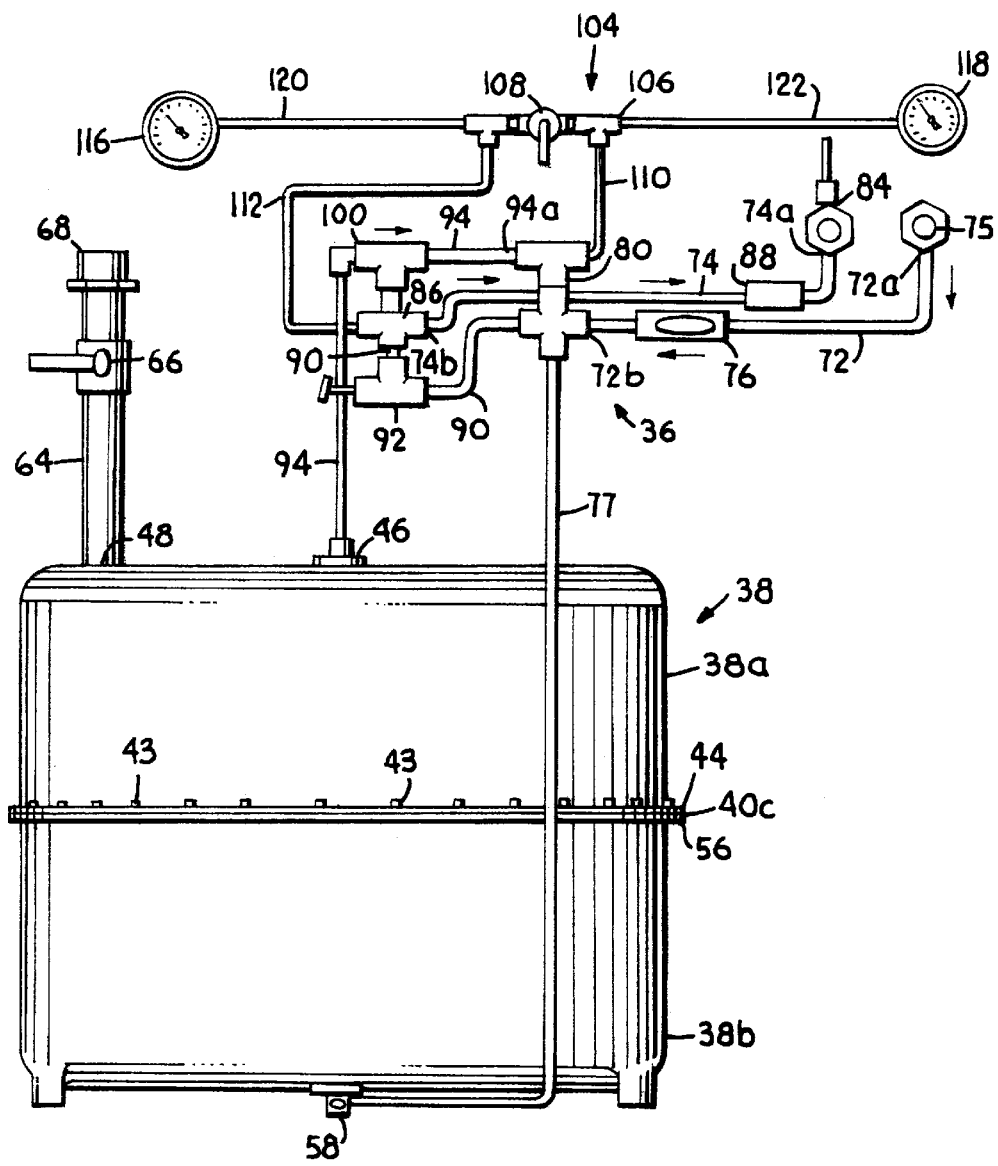
FIG. 17A is a schematic diagram of the conduit and control assembly with the arrows representing the flow circuit in a "test flow direction" mode.
Figure 18A:
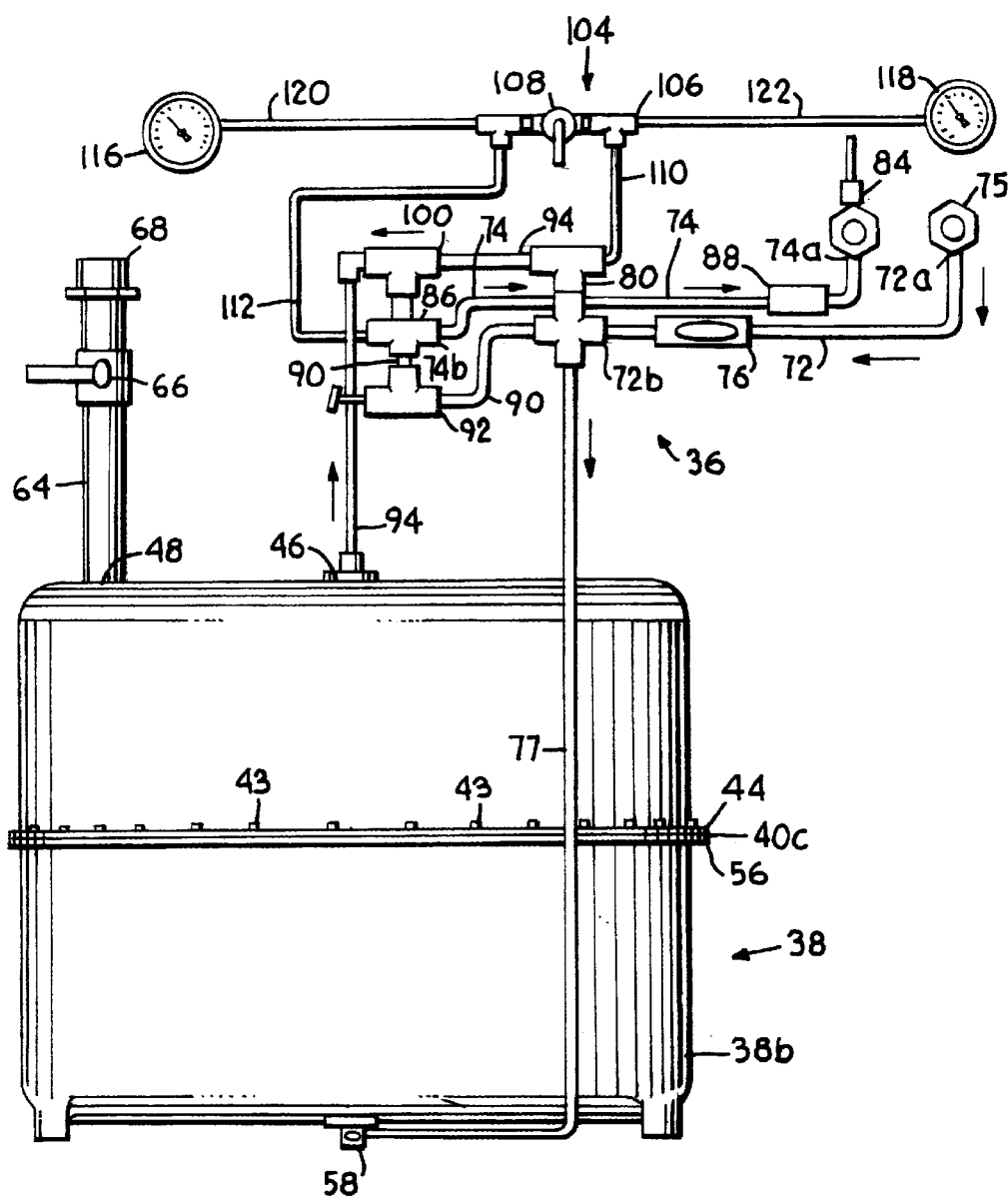
FIG. 18A is a schematic diagram of the conduit and control assembly with the arrows representing the flow circuit in the "process" mode.
Figure 18B:
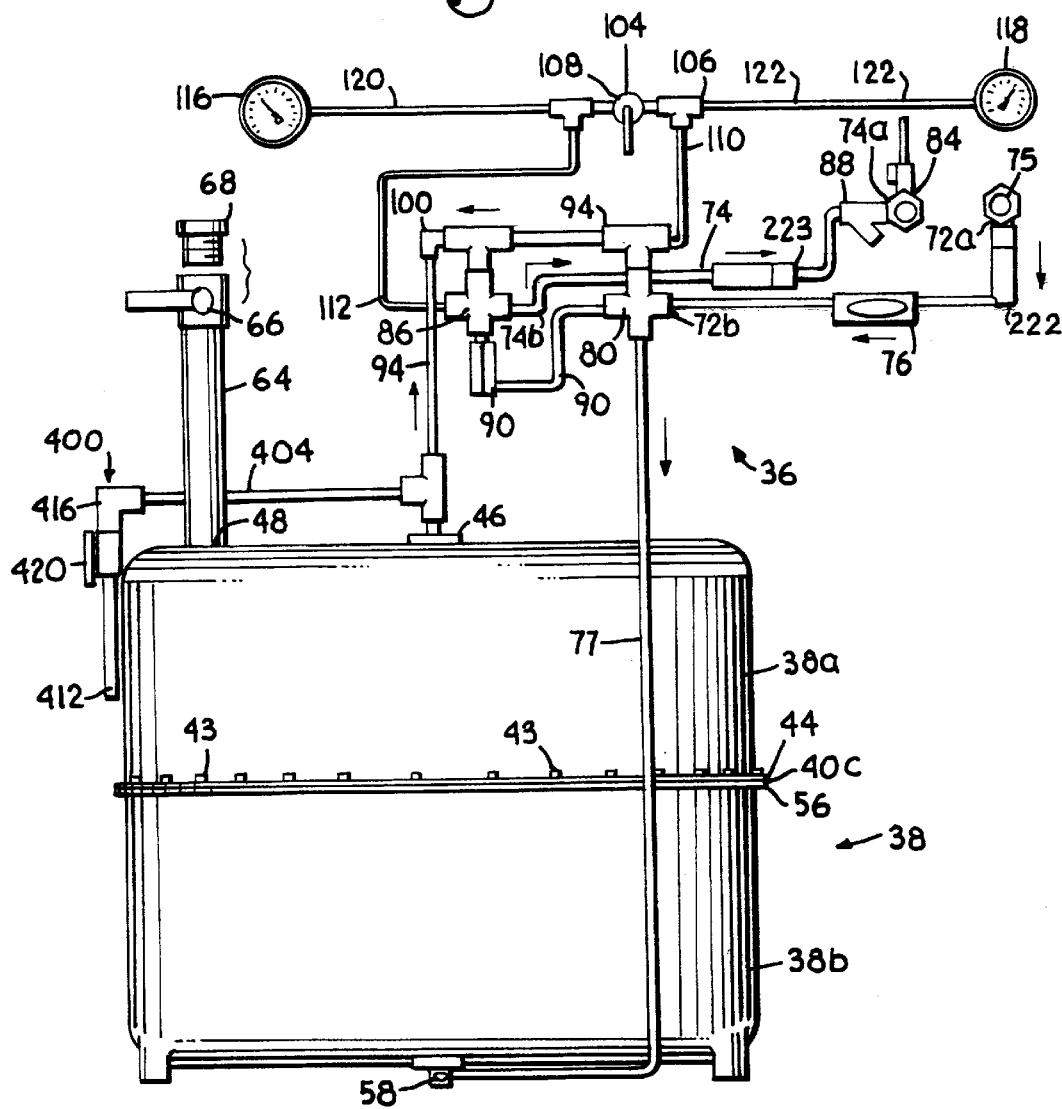
FIG. 18B is a schematic diagram of the conduit and control assembly of FIG. 18A including a pair of safety (pressure) regulators and a vent valve assembly.
Figure 19A:
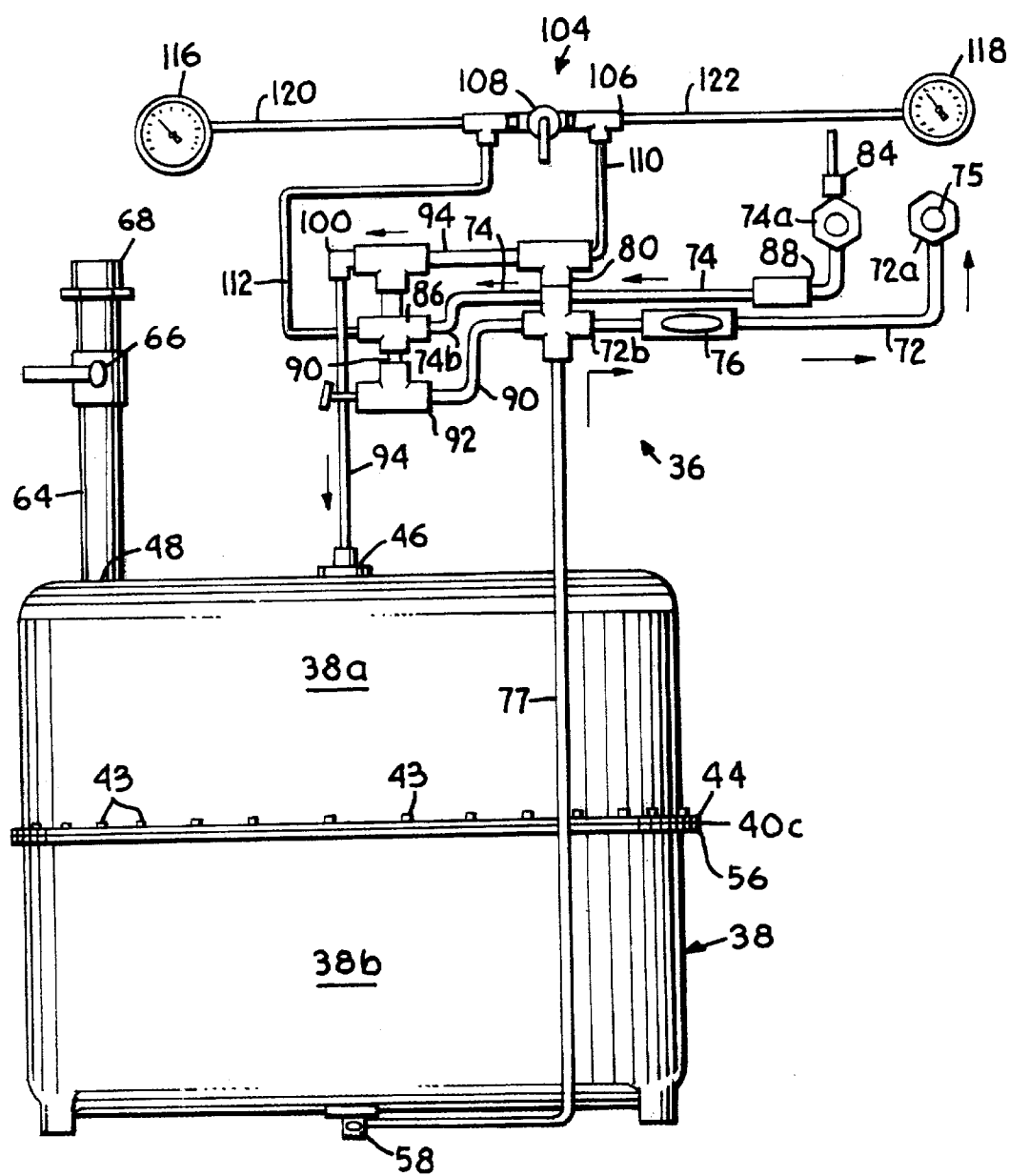
FIG. 19A is a schematic diagram of the conduit and control assembly for step 1 for recharging the apparatus with the arrows representing the flow circuit in a "recharge" mode.
Figure 19B:
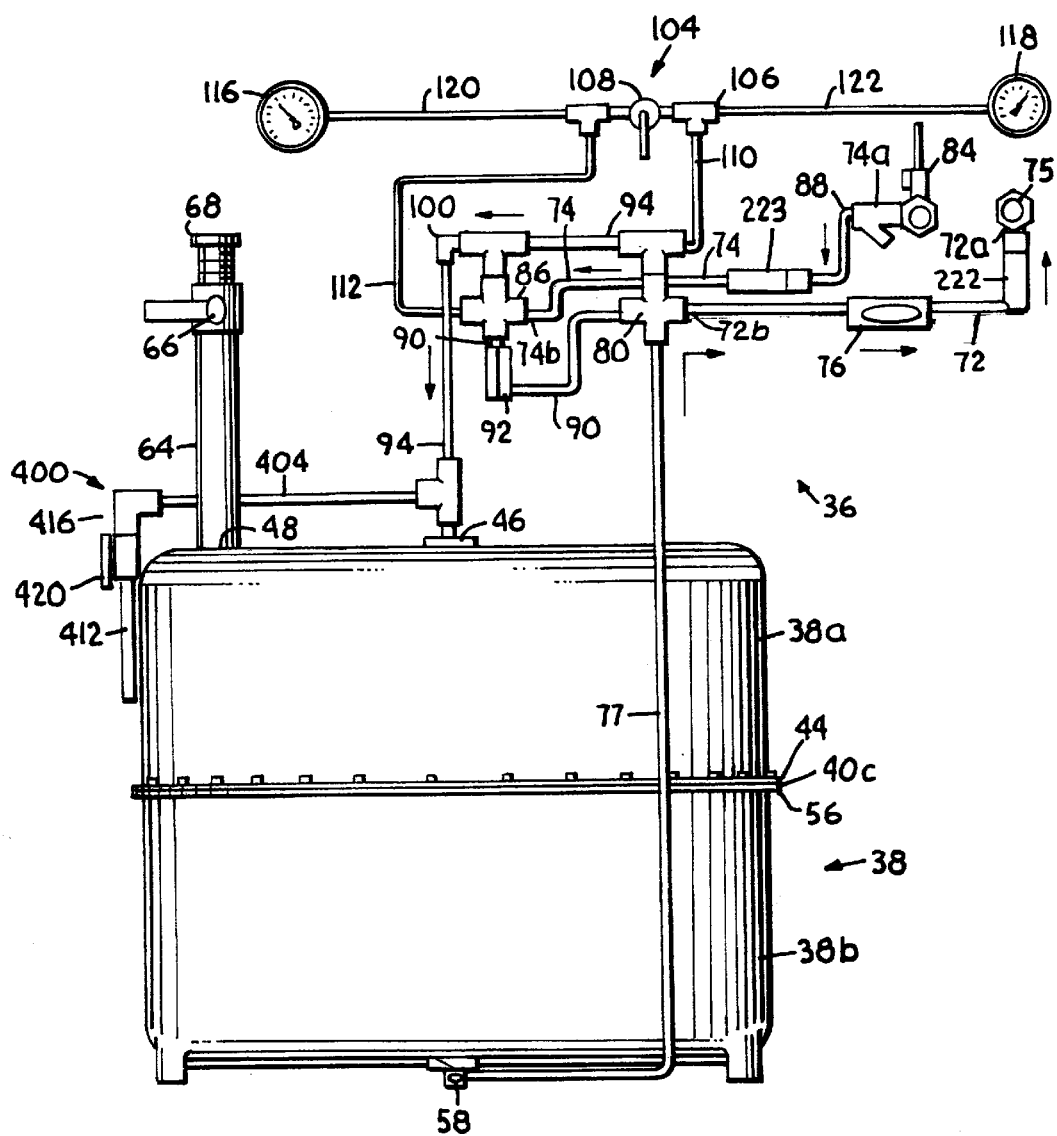
FIG. 19B is a schematic diagram of the conduit and control assembly of FIG. 19A including a pair of safety (pressure) regulators and a vent valve assembly.

The apparatus 10 includes a conduit and control assembly, generally illustrated as 36, engaged to and communicating with a cylinder or tank, generally illustrated as 38. Tank 38 contains a diaphragm type bladder 40 that separates the tank 38 into compartments 38a and 38b (see. FIGS. 11–16). Compartments 38a has an internal wall 42 that terminates in a perimeter 44 (see FIG. 16) and is formed with openings or ports 46 and 48. Fresh or new ATF 50 passes through openings or ports 46 and 48 for a purpose and in a manner to be described hereinafter. Compartment 38b has an internal wall 54 (see FIG. 16 again) that terminates in a perimeter 56. Compartment 38b has an opening or port 58 wherethrough used or contaminated ATF 60 passes. Preferably, the surface area of the internal wall 42 is approximately equal to the surface area of the internal wall 54. A tube 64 (see FIGS. 11, 15 and 16) connects to the compartment 38a such as to communicate with port 48. Tube 64 contains a valve 66 (see FIG. 10) that is used to close-off any communication that the insides of compartment 38a may have with the atmosphere. Valve 66 may be opened to allow new ATF 50 to be added into the tank 38 through tube 64. A cap 68 may be conveniently disposed over the end or top of tube 64 as best shown in FIGS. 17A and 17B to prevent dust and dirt from entering the tube 64 and possibly commingling with new ATF 50.

Figure 11:
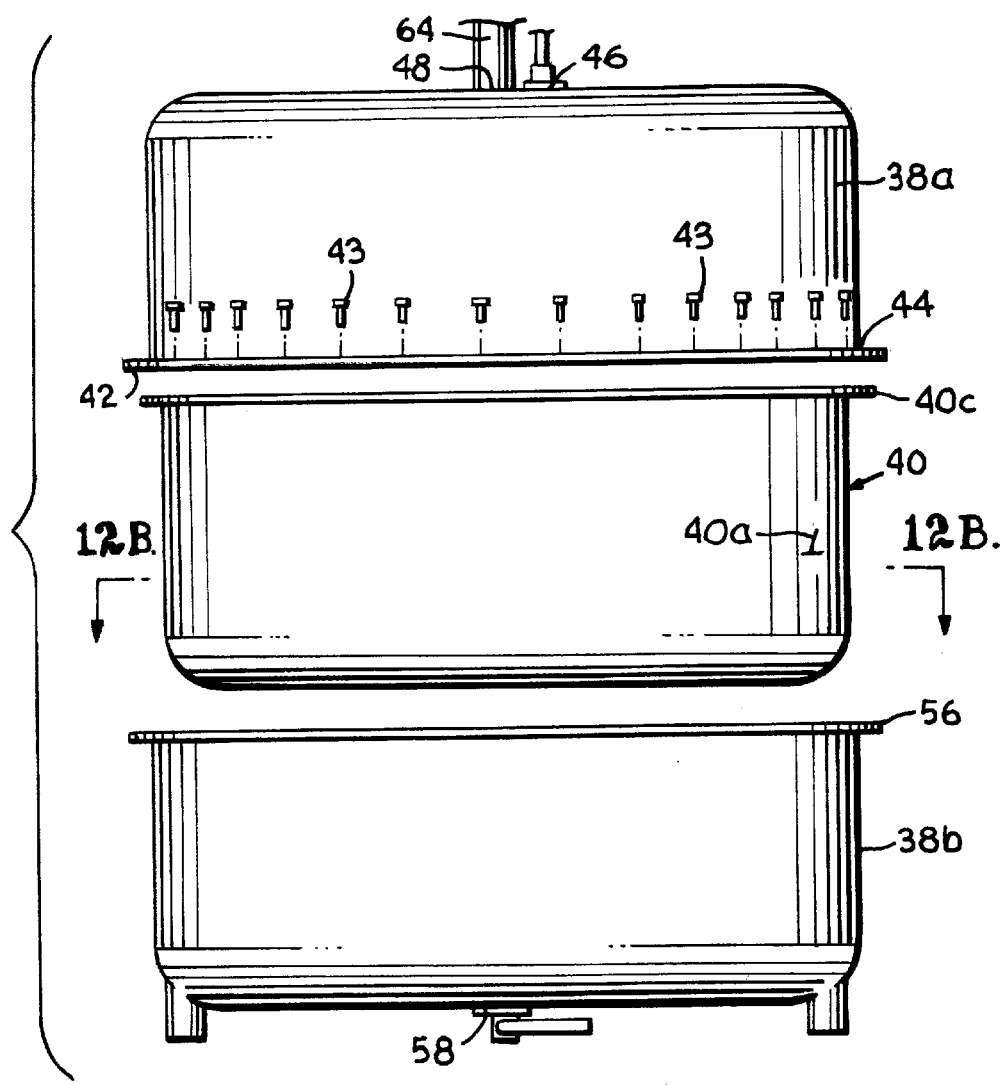
FIG. 11 is a segmented front elevational view of the tank or cylinder and the tub-like bladder.
Figure 12B:
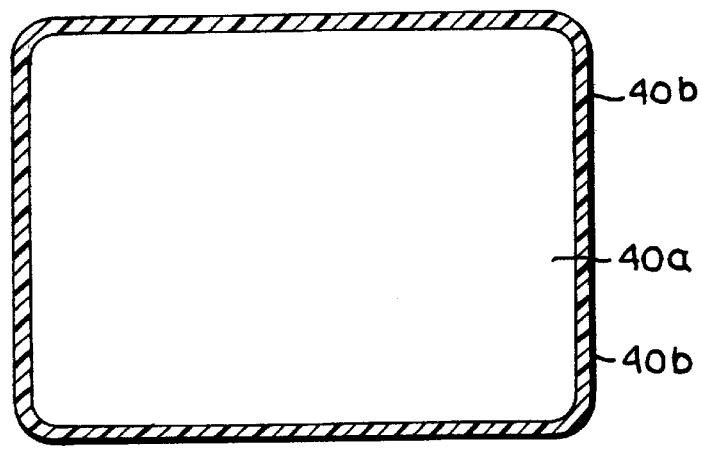
FIG. 12B is a vertical sectional view taken in direction of the arrows and along the plane of line 12B—12B in FIG. 11.
Figure 12A:
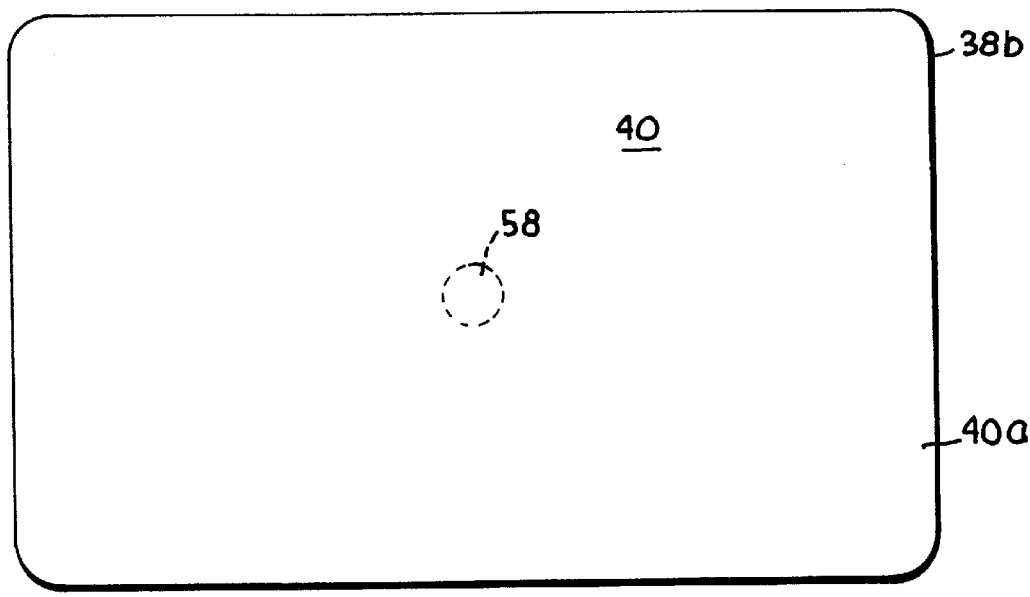
FIG. 12A is a top plan view taken in direction of the arrows and along the plane of line 12A—12A in FIG. 12.

The diaphragm type bladder 40 is preferably a tub-like pliable bladder 40 (see FIG. 11) that is capable of performing the function set forth herein. The bladder 40 (see FIGS. 12 and 12B) has a pair of surfaces 40a and 40b, each respectively having surface areas that are at least about essentially equal to the surface areas of the internal walls 42 and 54, respectively. The spirit and scope of the present invention would encompass the bladder 40 with surfaces 40a and 40b having respective surface areas that would be larger than the surface areas of the internal wall 42 and 54 respectively, as best shown in FIG. 13. In a preferred embodiment of the present invention, the surface areas of surfaces 40a and 40b of the bladder 40 and the surface areas of the internal walls 42 and 54 of the compartments 38a and 38b respectively are all essentially equal. In this preferred embodiment of the present invention, surface 40b would be capable of being essentially flushed against the surface of the internal wall 54, as best shown in FIGS. 12 and 15. Likewise, surface 40a would be capable of being essentially flushed against the surface of internal wall 42, as best shown in FIG. 16. As will be further explained below, for this preferred embodiment of the present invention, when the surface areas of surfaces 40a and 40b and of the internal walls 42 and 54 are all essentially equal, there would be an effective transfer of equal volumes of new ATF 50 and used ATF 60 into and out of the tank 38. When there is such a transfer of an equal volume, the bladder 40 would move from one essentially flushed position (e.g. a position where surface 40b is essentially flushed against the surface of the internal wall 54 as best shown in FIG. 15) to another or opposed essentially flushed position (e.g. a position where surface 40a is essentially flushed against the surface of the internal wall 42 as best shown in FIG. 16).

The bladder 40 has a perimeter 40c that engages and connects to the perimeters 44 and 56 of compartments 38a and 38b respectively. More preferably and as best shown in FIGS. 11 and 17, the perimeter 40c of the bladder 40 is sandwiched or compressed between the perimeters 44 and 56 of the compartments 38a and 38b respectively. Such an engagement and with the assistance of bolts 43 provides for a steadfast connection of the bladder 40 to the perimeters 44 and 56 and facilitates the movement of the bladder 40 within the tank 38 and particularly between the compartments 38a and 38b.

The bladder 40 may be manufactured from any suitable material, such as plastic (e.g. polyethylene, polypropylene, ABS, etc.), rubber, etc. Preferably, the bladder 40 is formed of an essentially non-elastic and/or non-rubber material; that is, a material that does not stretch to any significant degree when ATF flows into and out of the tank 38. The bladder 40 manufactured from a rubber material (e.g. polychloroprene, polyisoprene, etc.) would exhibit elasticity in that it would recover its original shape at least partially or completely after a deforming force (i.e. the flow of ATF) has been removed. The purpose of the bladder 40 is not to necessarily stretch but to act as a separator within the tank 38 between new ATF 50 and used ATF 60 and to preferably insure that the volume of used or contaminated ATF 60 leaving the transmission 12 and passing into the tank 38 is essentially equal to the volume of new ATF 50 leaving the tank 38 and passing into the transmission 12 and/or essentially equal to the volume of the tank 38. Stated alternatively, the bladder 40 preferably insures that the volume of new ATF 50 within the tank 38 (which volume of new ATF 50 preferably being essentially equal to the volume of the tank 38 itself) is replaced with an essentially equal volume of used ATF 60 (which volume of used ATF 60 preferably being also essentially equal to the volume of the tank 38 itself).

The tank 38 may have any suitable volume or fluid capacity, but preferably has an ATF capacity of approximately four (4) U.S. gallons. When the tank 38 is fully charged with ATF, the diaphragm type bladder 40 is against the inside walls of the opposite end from the one being filled. More specifically and as best shown in FIGS. 14–16, when the tank 38 is fully charged with new ATF 50, the surface 40b of the bladder 40 is preferably flushed or essentially flushed against the surface of the internal wall 54 of compartment 38b (see FIG. 15). As used ATF 60 is removed from the transmission 12 and passes through port or opening 58 of compartment 38b, a pressure equal to the pressure of inflowing used ATF 60 is immediately exerted against side 40b of the bladder 40; and thus exerted pressure instantaneously causes new ATF 50 to be expelled through port or opening 48 of compartment 38a. As used ATF 60 flows through port or opening 58 and into compartment 38b and as new ATF 50 is being discharged out of compartment 38a through port or opening 46, the bladder 40 initially has no restraints or defined boundaries and is freely moving between the used ATF 60 and the new ATF 50, such as in the generally sinusoidal pattern set forth in FIG. 14. When essentially all of the used ATF 60 has been removed from the transmission 12 and when essentially all of the new ATF 50 has been discharged from compartment 38a, the surface 40a of the bladder 40 is preferably flushed or essentially flushed against the surface of the internal wall 42 of compartment 38a, as best illustrated in FIG. 16.

The diaphragm-type bladder 40 exerts no pressure on the ATF itself. As previously indicated, when used ATF 60 is pumped into an end (i.e. compartment 38b) of the tank 38, which end now has no capacity since the surface 40b of the bladder 40 is essentially flushed against the internal wall 54 (see FIG. 15), a pressure is immediately exerted on the fluid side (i.e. surface 40a) of the bladder 40 equal to the pressure applied. When a control value (identified as "100" below) is opened, new ATF 50 will be released through the connected hoses (i.e. hoses 14 and 16) at the same rate that used ATF 60 is being pumped into the tank 38 (i.e. compartment 38b) because the pressures are the same on both sides of the bladder 40. When it is said that the pressures are the same, it is to be understood that the small amount of resistance created in moving the bladder 40 and the ATF behind it, does consume a small amount of pressure. Movement of the bladder 40 and the ATF varies as to the amount of ATF changes in the particular compartment being evacuated. Therefore, an average pressure differential over the process of emptying one side of the diaphragm type bladder 40 would be approximately 1–2 psi. This small amount of difference is totally insignificant in terms of the volume of ATF in the transmission 12 at any point during the transfusion. When the transfusion is complete, the volume in the transmission 12 will be the same as at the beginning of the process.

The conduit and control assembly 36 contained within cabinet 11 comprises conduits 72 and 74. Conduit 72 has opposed ends 72a and 72b respectively engaging a conduit connector 75 and a multi-outlet joint 80 and includes a flow indicator 76 for visually determining the direction of ATF flow within conduit 72. For the embodiment of the invention depicted in FIGS. 10B, 17B, 18B 19B, 20B, 21B, 22B and 23A–23B, conduit 72 includes a pressure regulator 222 to regulate the pressure emanating from an engine of a vehicle, more specifically from the transmission 12. It is desired that pressure off of the transmission 12 and from incoming used ATF 60 being removed from the transmission 12 does not exceed a certain prescribed pressure, preferably about 75 psi, in order to prevent damage to the tank 38 as well as its associated parts and other elements of the apparatus 10. The pressure regulator 222 within (or part of) conduit 72 insures that the tank 38 as well as its associated parts and other elements of the apparatus 10 are not exposed to any pressure greater than the prescribed pressure.

Figure 20A:
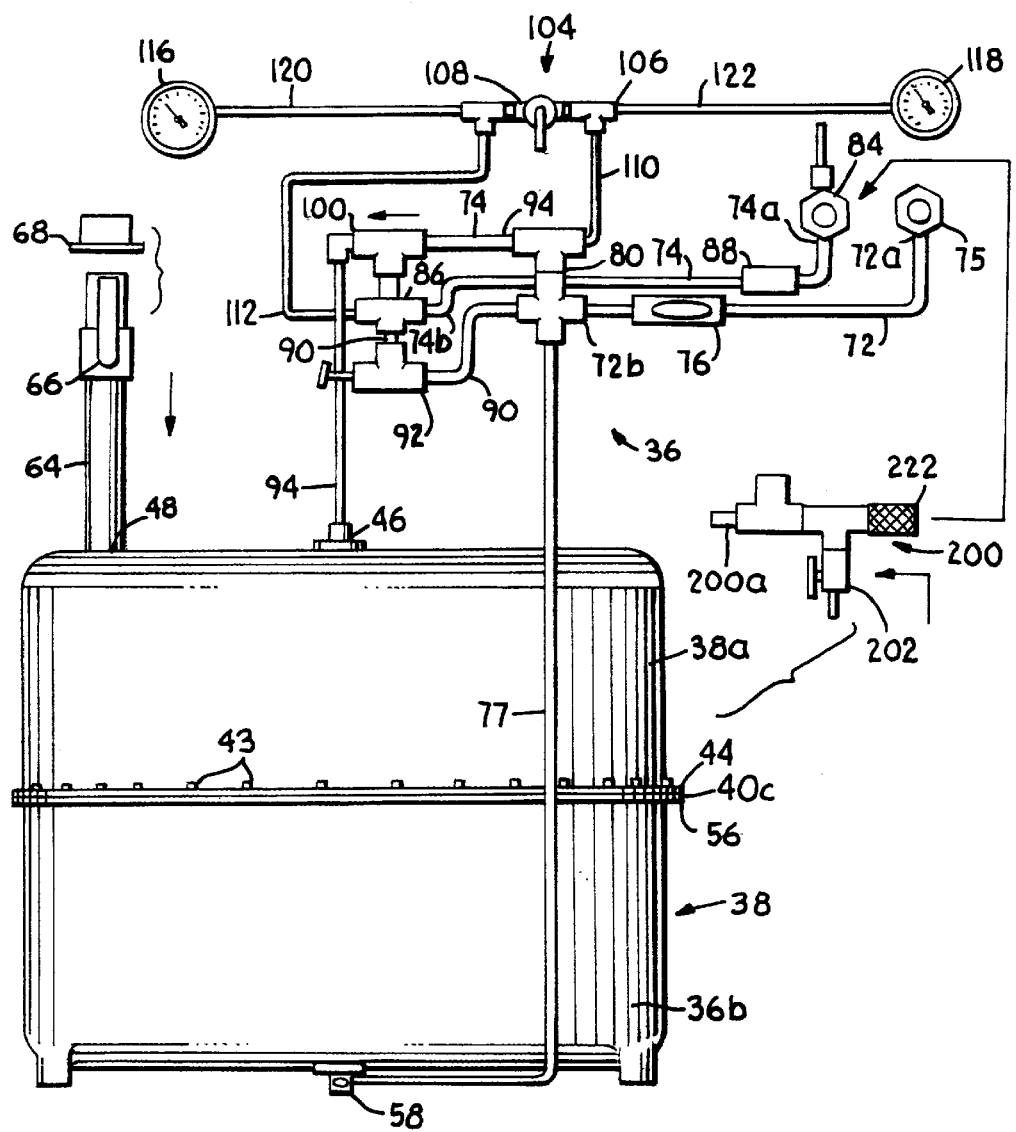
FIG. 20A is a schematic diagram of the conduit and control assembly of FIG. 19A and for step 2 of the flow circuit in a "recharge" mode.
Figure 21A:
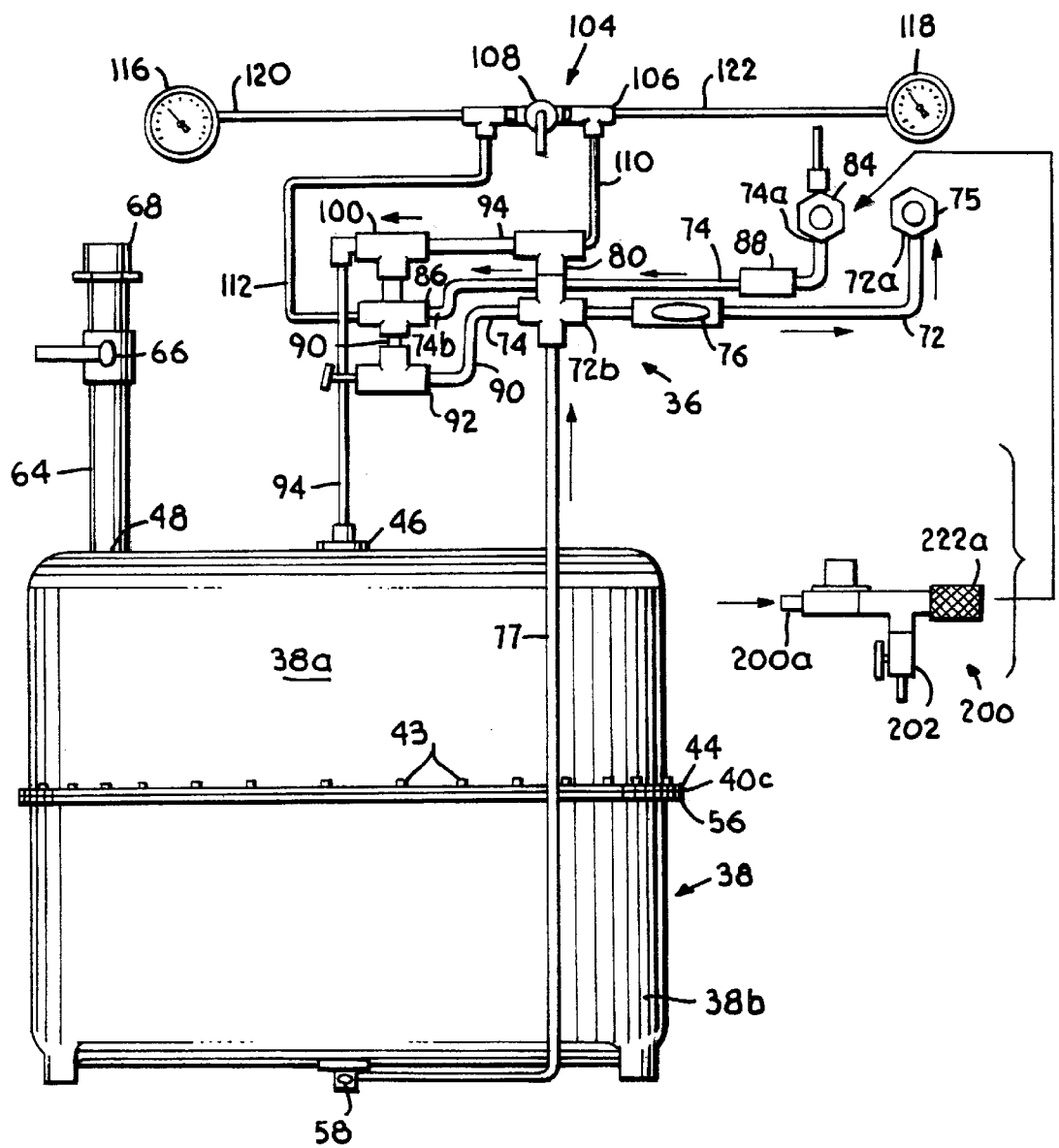
FIG. 21A is a schematic diagram of the conduit and control assembly with the arrows representing the flow circuit in a "recharge" mode with a pressurized new ATF supply.
Figure 21B:
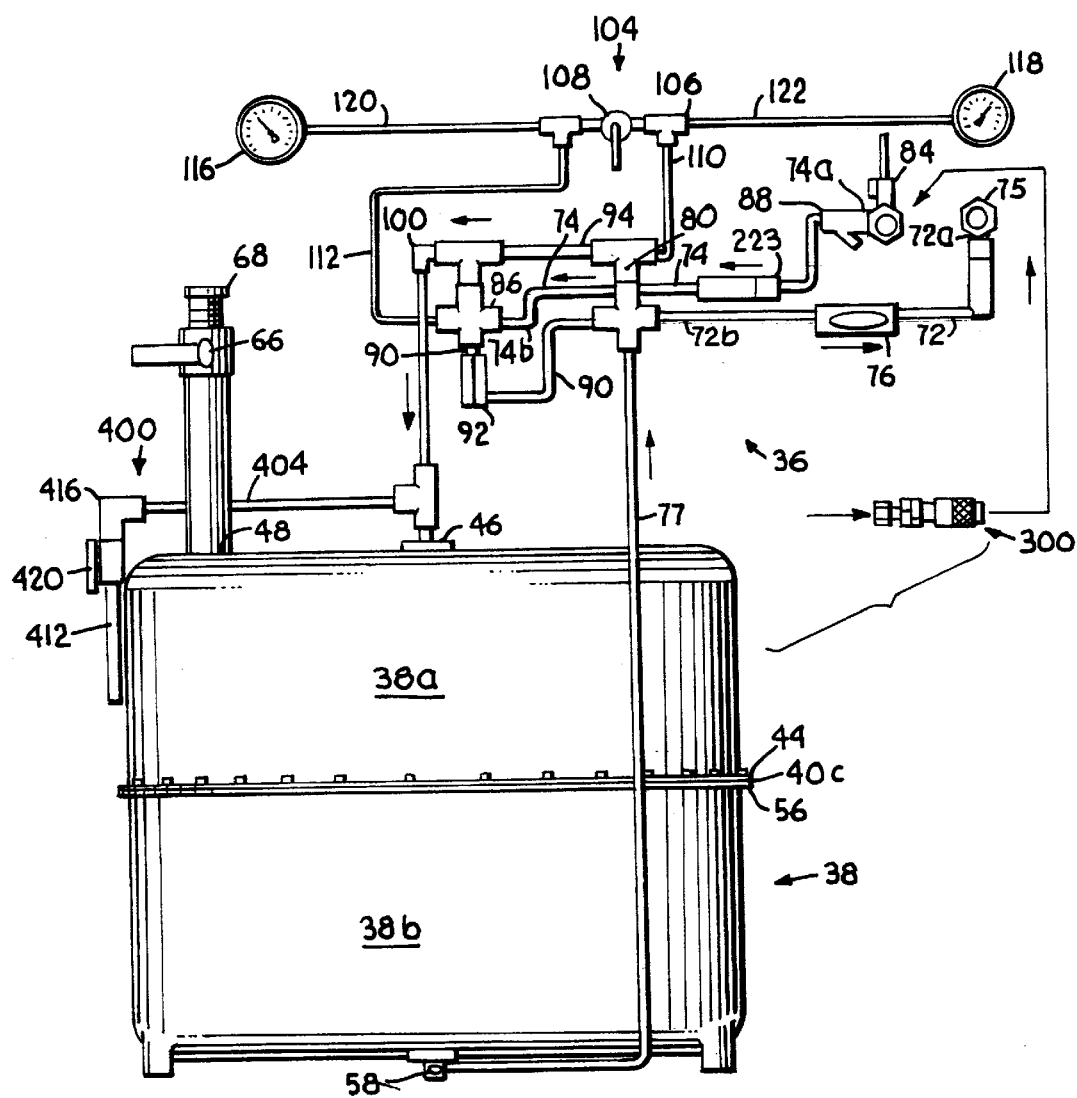
FIG. 21B is a schematic diagram of the conduit and control assembly of FIG. 21A including a pair of safety (pressure) regulators and a vent valve assembly.
Figure 22A:
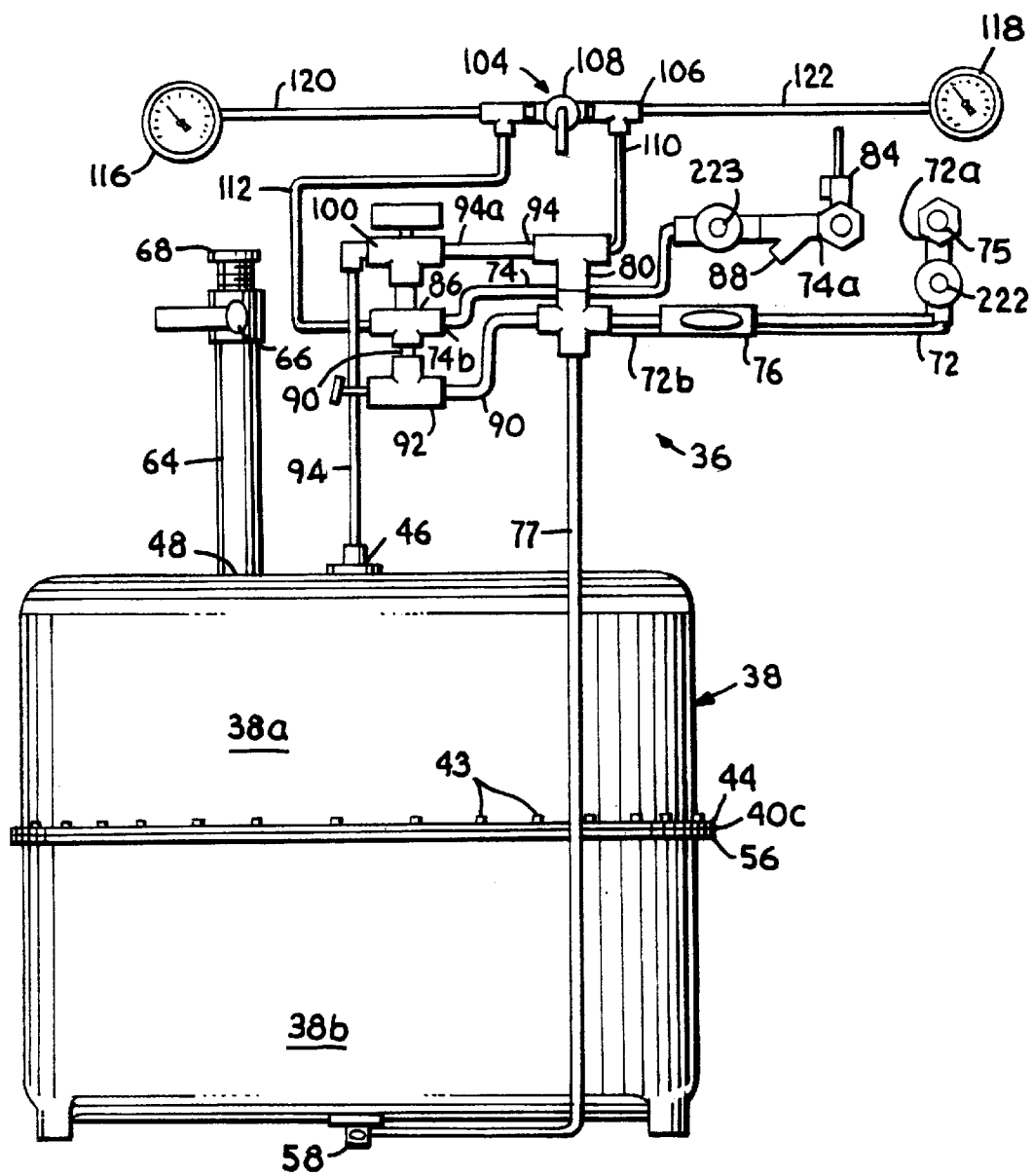
FIG. 22A is a schematic view of another embodiment of the conduit and control assembly for the present invention including a pair of safety (pressure) regulators, with one safety (pressure) regulator being disposed in the conduit for carrying new ATF and with the other safety (pressure) regulator being disposed in the conduit for carrying used ATF.
Figure 22B:
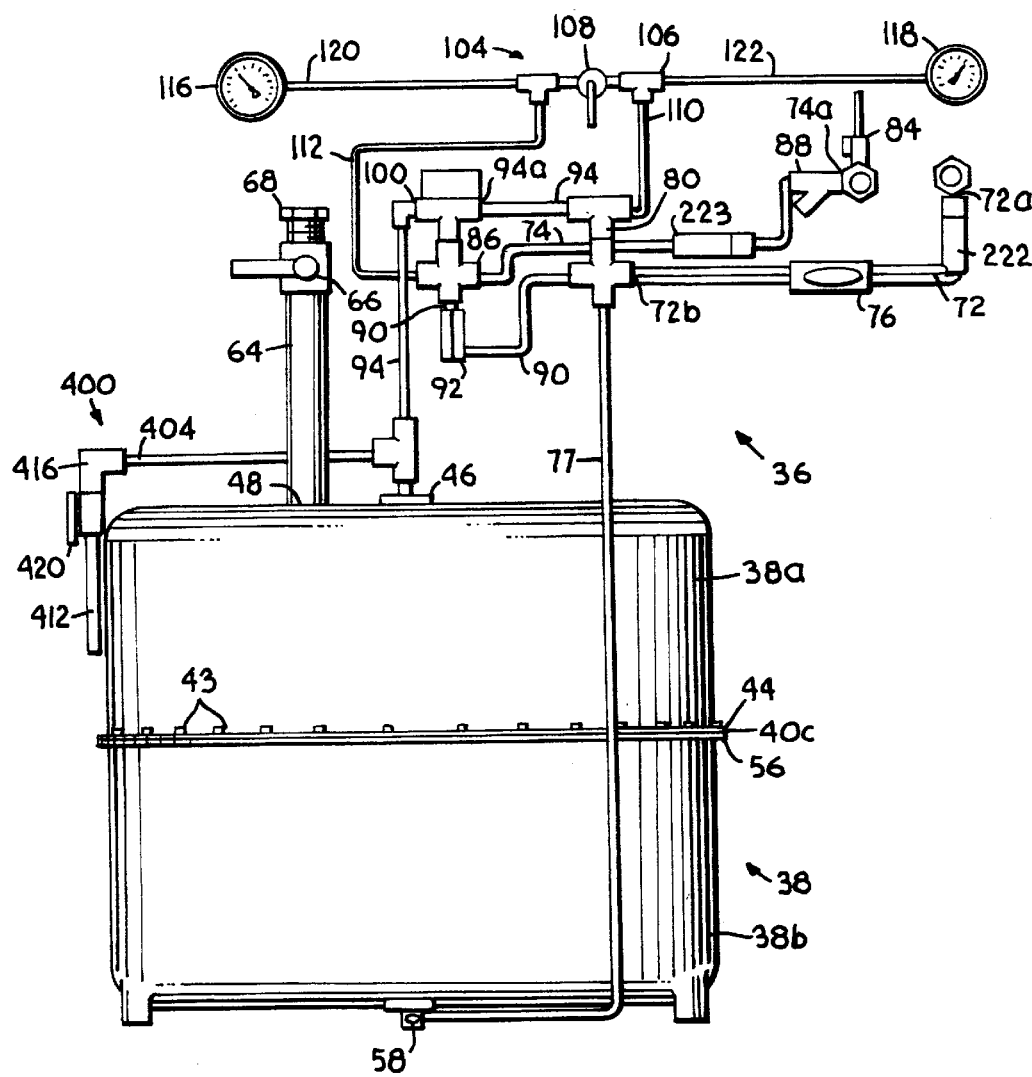
FIG. 22B is a schematic view of the conduit and control assembly of FIG. 22A including the pair of safety (pressure) regulators and a vent valve assembly.
Figure 23A:
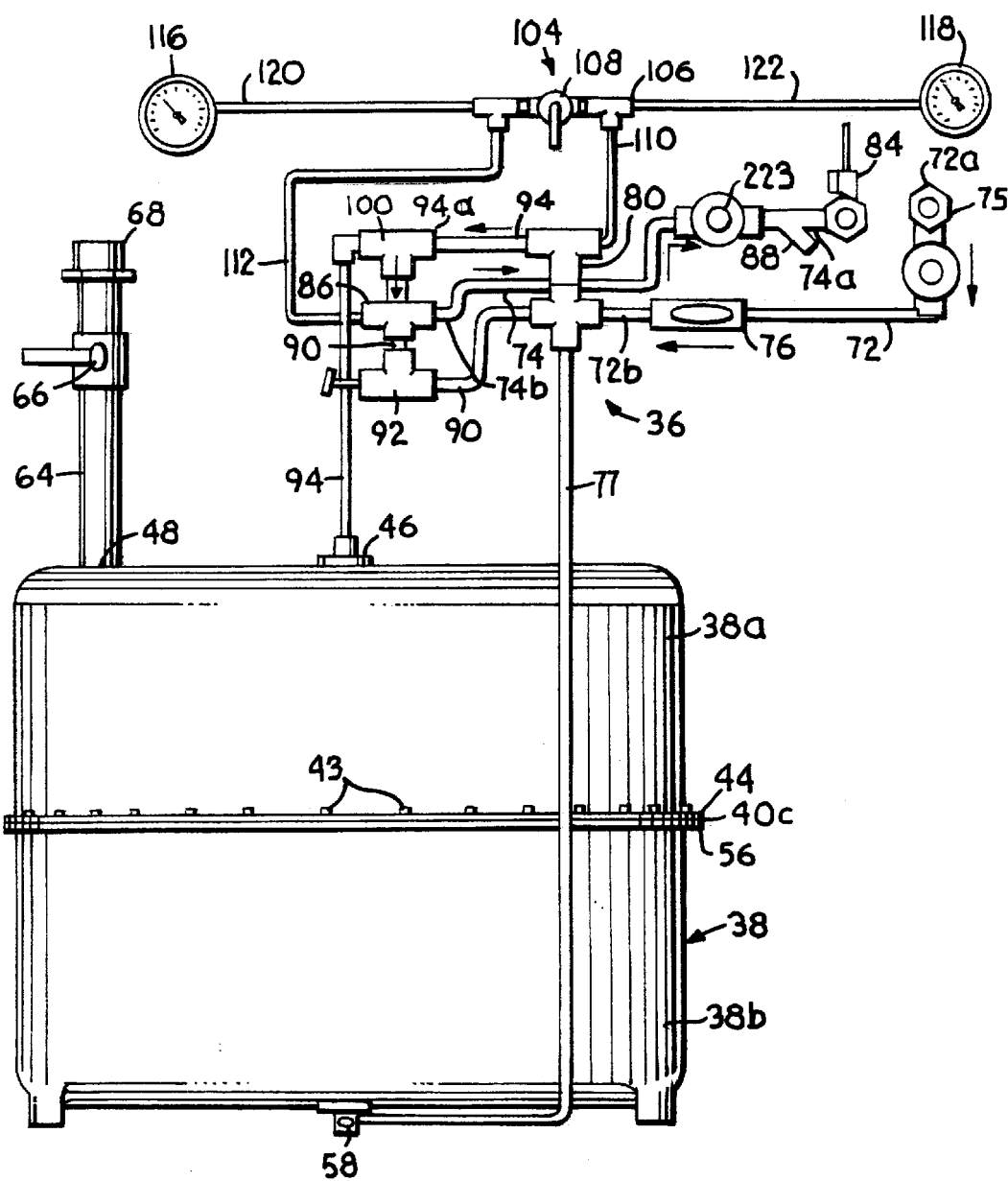
FIG. 23A is a schematic diagram of the conduit and control assembly for the embodiment of the invention of FIG. 22A with arrows representing the flow circuit in a "test flow direction" mode.
Figure 23B:
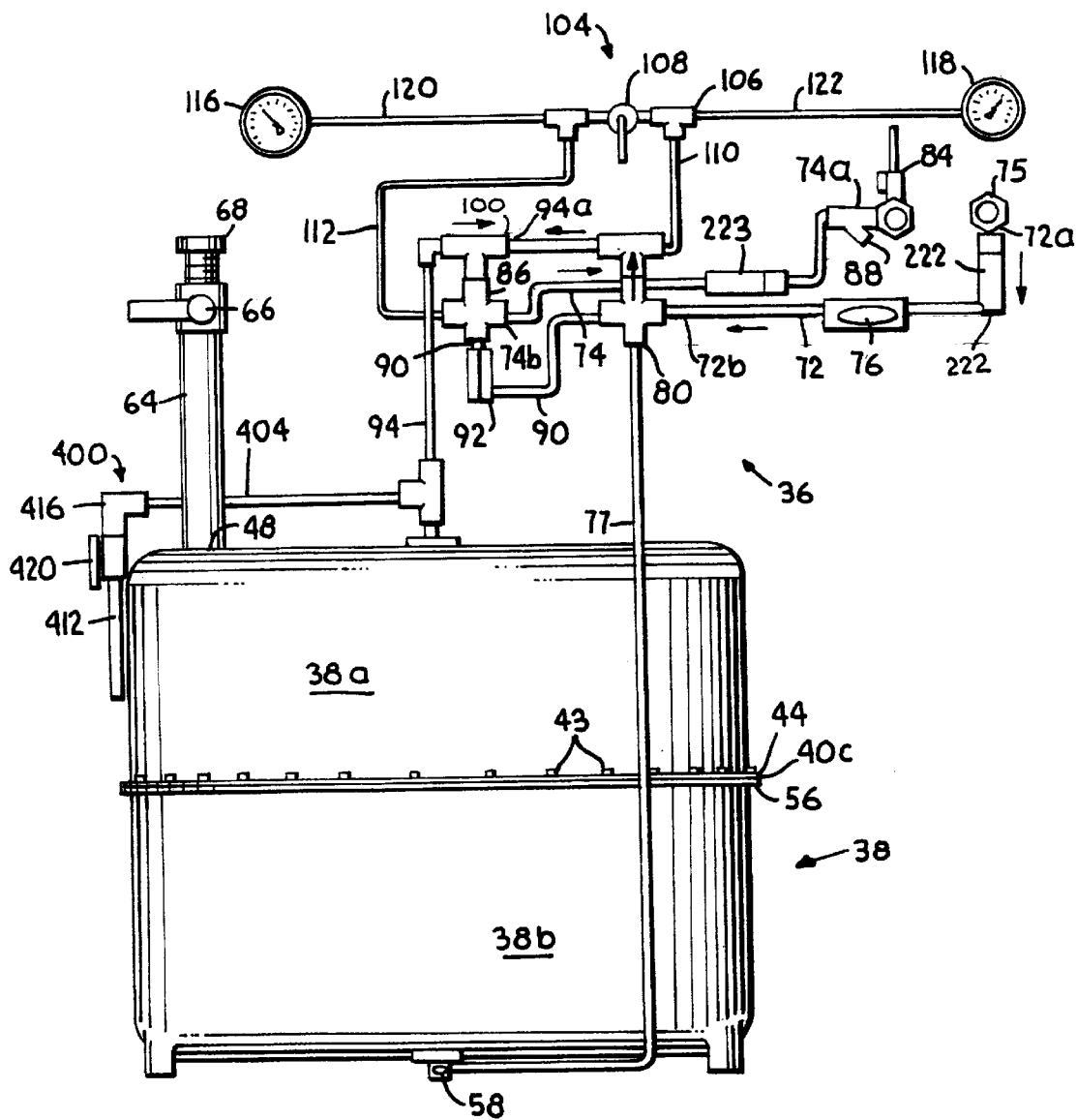
FIG. 23B is another embodiment of the conduit and control assembly of FIG. 23A including a pair of safety (pressure) regulators and a vent valve assembly.
Figure 24A:
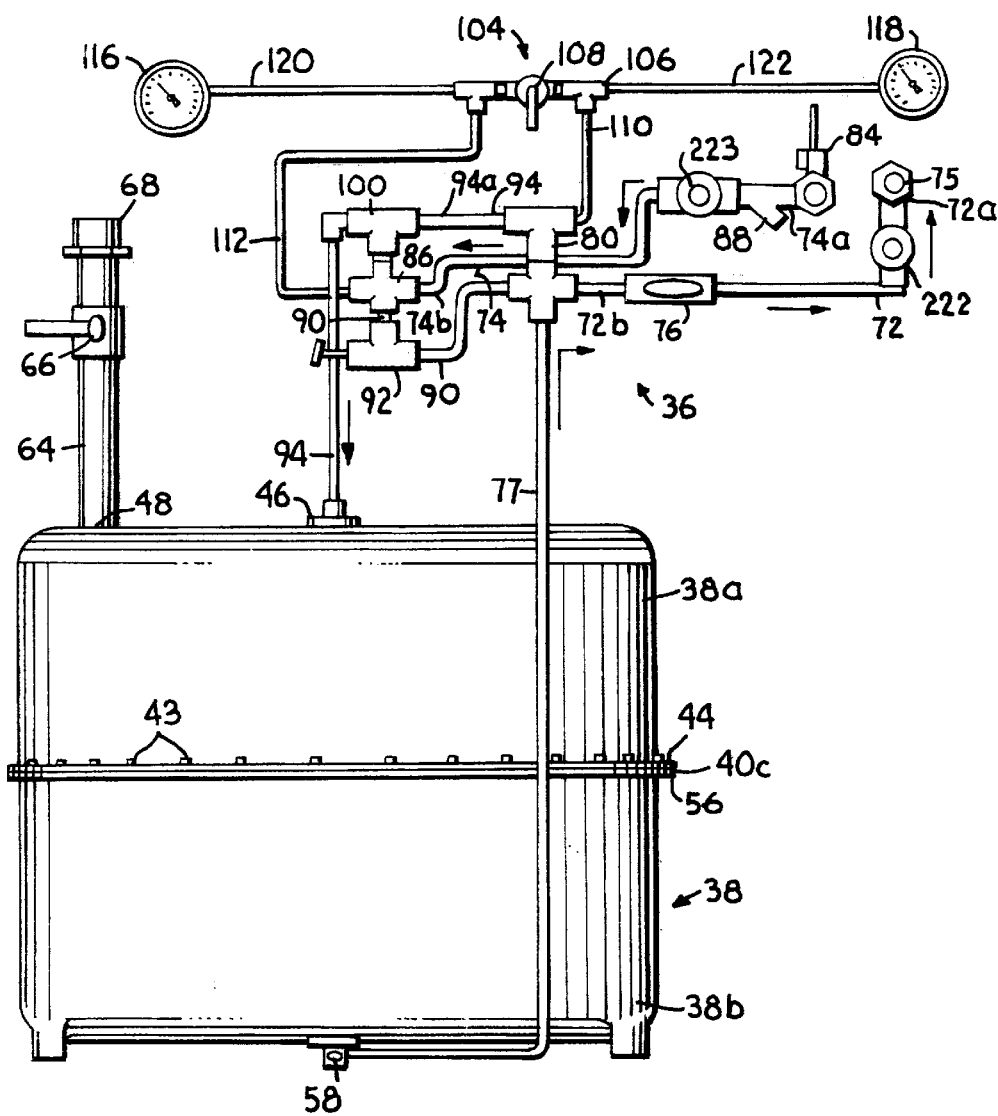
FIG. 24A is a schematic diagram of the conduit and control assembly of the embodiment of the invention illustrated in FIG. 22A for step 1 in recharging the apparatus with arrows representing the flow circuit in a "recharge" mode.
Figure 24B:
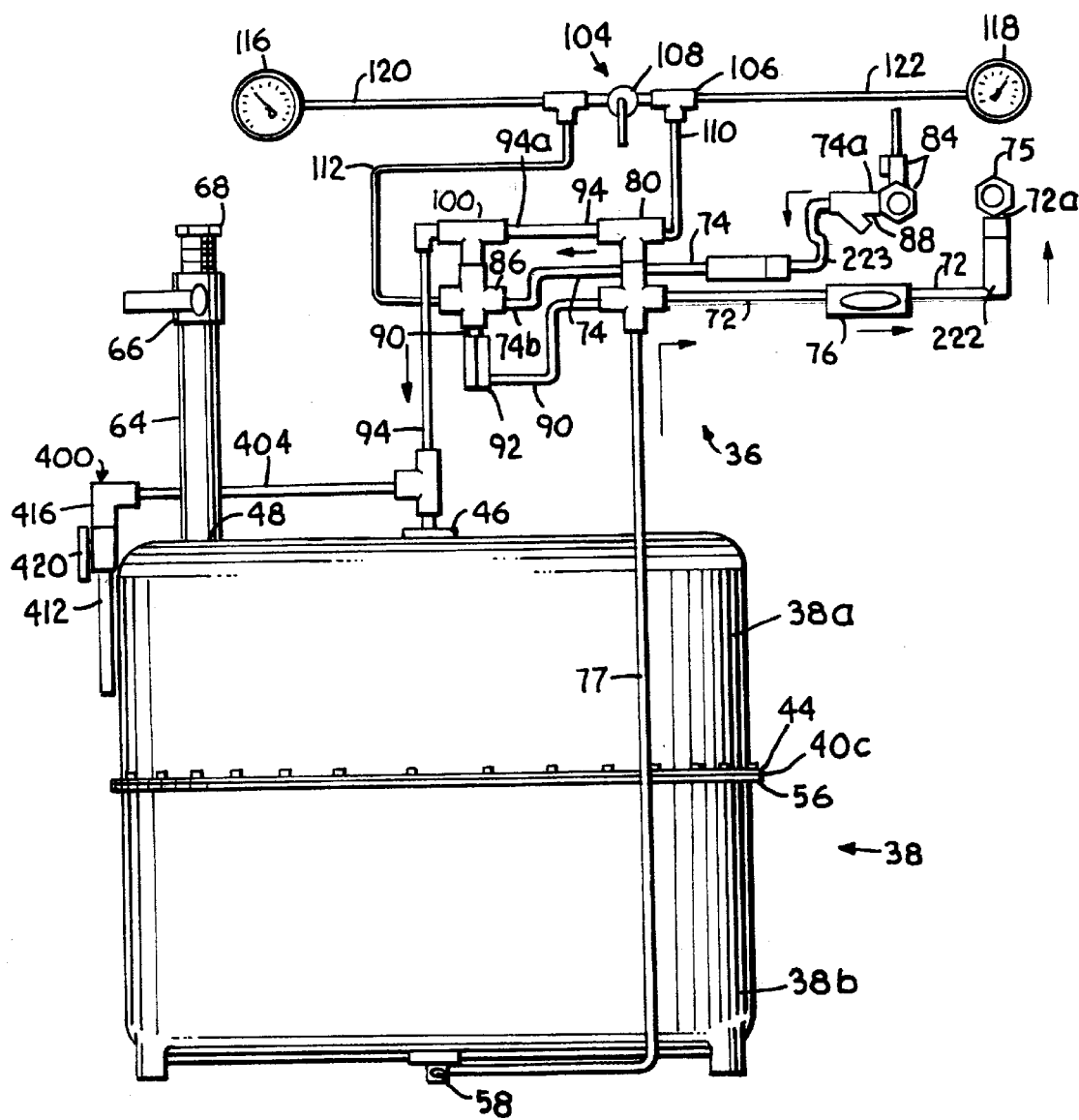
FIG. 24B is a schematic diagram of the conduit and control assembly of FIG. 24A including a pair of safety (pressure) regulators and a vent valve assembly.
Figure 25B:
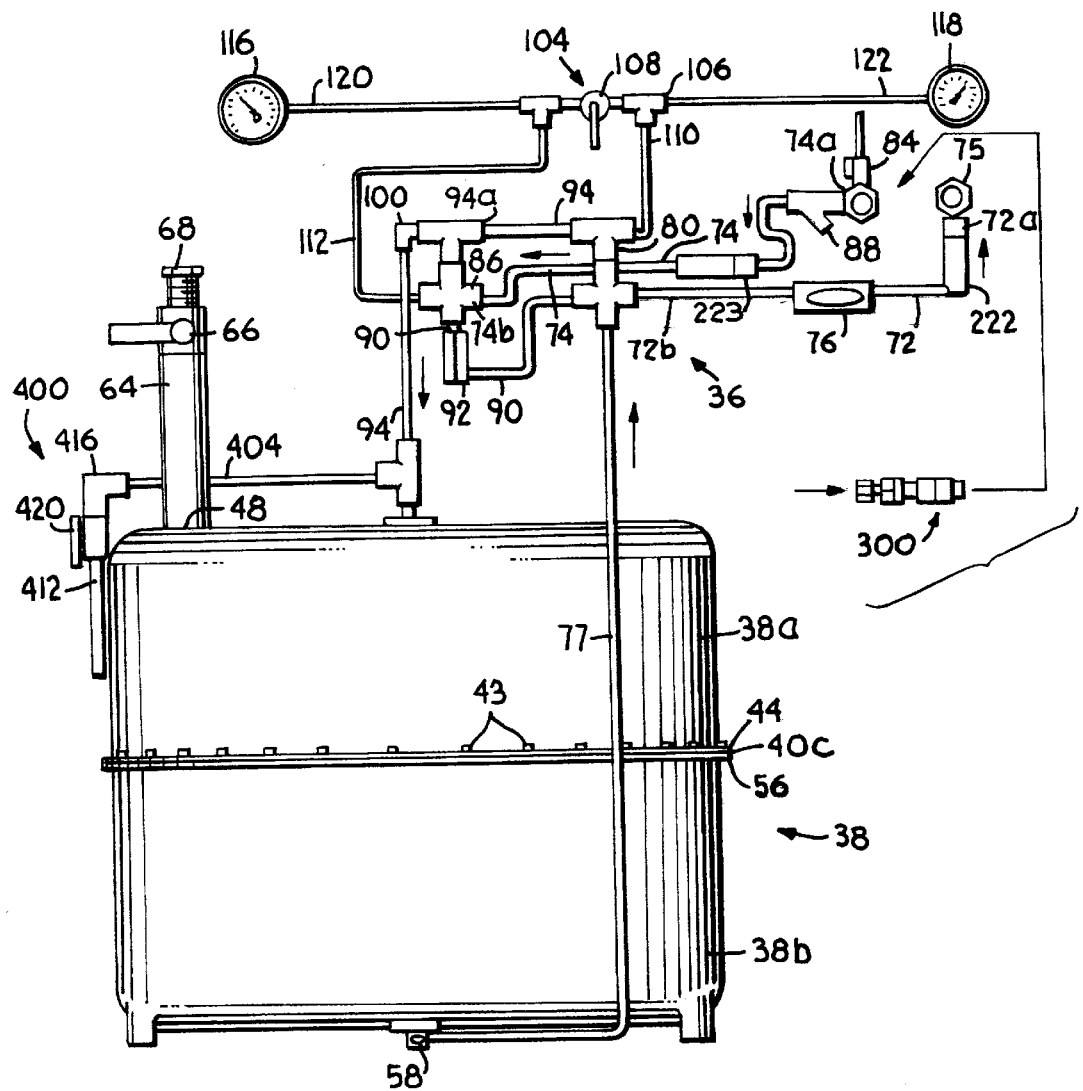
FIG. 25B is a schematic diagram of the conduit and control assembly of FIG. 25A including a pair of safety (pressure) regulators, a vent valve assembly, and another embodiment of the recharge adapter.

Conduit 77 connects to compartment 38b and to multi-outlet joint 80 such that the port or opening 58 communicates with the multi-outlet 80. Conduit 74 is formed with opposed ends 74a and 74b that respectively attach to an outlet/spigot 84 and to a 4-way outlet joint 86. A strainer/filter 88 is placed within conduit 74 for filtering ATF passing through conduit 74. For the embodiment of the invention illustrated in FIGS. 22–25, conduit 74 also includes a pressure regulator 223. The pressure regulator 223 within or part of conduit 74 is to protect the tank 38 if an operator inadvertently connects the hoses 14 and 16 (which respectively engage outlet/spigot 84 and conduit connector 75) at wrong accessible points along the ATF route 18 such that conduit connector 75 is receiving therethrough used ATF 60 for passage into conduit 74 as opposed to discharging new ATF 50 from conduit 74. In such an instance conduit 74 would be communicating with pressure from an engine of a vehicle, more particularly from the transmission 12. As was previously indicated, it is desired that the tank 38 and its associated parts are not exposed to a pressure that would exceed a certain prescribed pressure (preferably 75 psi) in order to prevent damage to the tank 38 and/or other elements associated with the apparatus 10. Therefore, the pressure regulator 223 is placed within conduit 74 as a safety precaution to insure that the tank 38 as well as its associated parts and other elements of the apparatus 10 are not exposed to any pressure greater than the prescribed pressure in the event that hoses 14 and 16 are inadvertently connected by an operator to wrong accessible points along the ATF route 18. For the embodiment of the invention depicted in FIGS. 10A, 17A, 18A 19,A 20A and 21A, pressure regulators 222 and 223 are not respectively contained within conduits 72 and 74, but a single pressure regulator (e.g. pressure regulator 222) is engaged to a recharge adapter (identified as "200" below) as best shown in FIGS. 20A, 21A and 26.

Figure 1D:
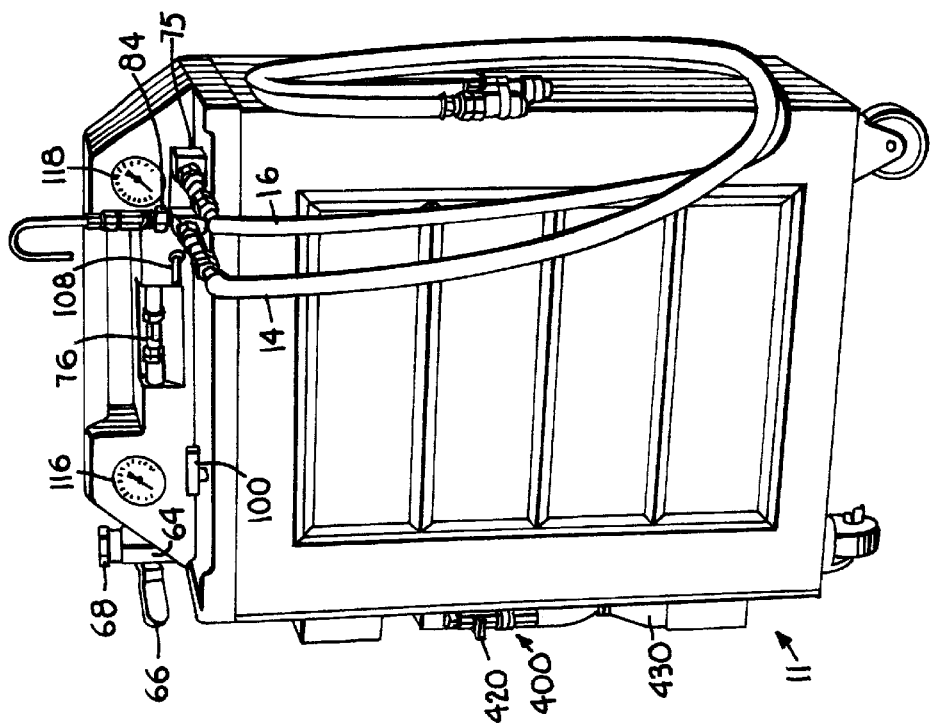
FIG. 1D is another perspective view of the cabinet that houses another embodiment of the apparatus of the present invention with a vent valve assembly shown mounted on a side of the cabinet.
Figure 29:
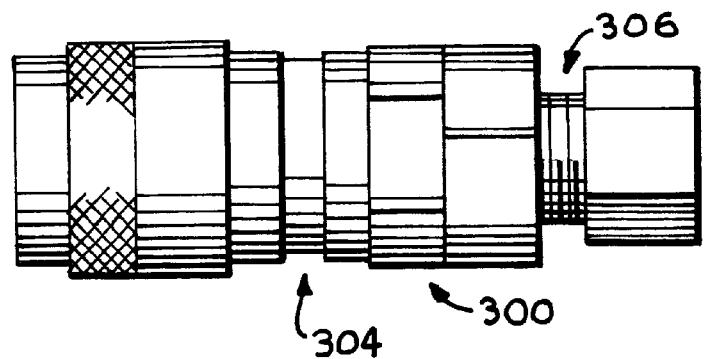
FIG. 29 is a side elevational view of the recharge adapter of FIG. 28.

For the embodiment of the invention illustrated in FIGS. 10B, 17B, 18B, 19B, 20B, 21B, and 22A–25B, no pressure regulator would be needed on any recharge adapter, as best shown in FIG. 27. For this latter embodiment of the present invention, a recharge adapter (identified as "200" below) is preferably replaced by another recharge adapter, generally illustrated as 300 (see FIGS. 1D, 28 and 29). As best shown in FIGS. 28 and 29, recharge adapter 300 includes a female hydraulic coupler, generally illustrated as 304, coupled to a check valve or back pressure valve, generally illustrated as 306. Also for this latter embodiment of the present invention, a vent valve assembly, generally illustrated as 400, is provided.

Figure 20B:
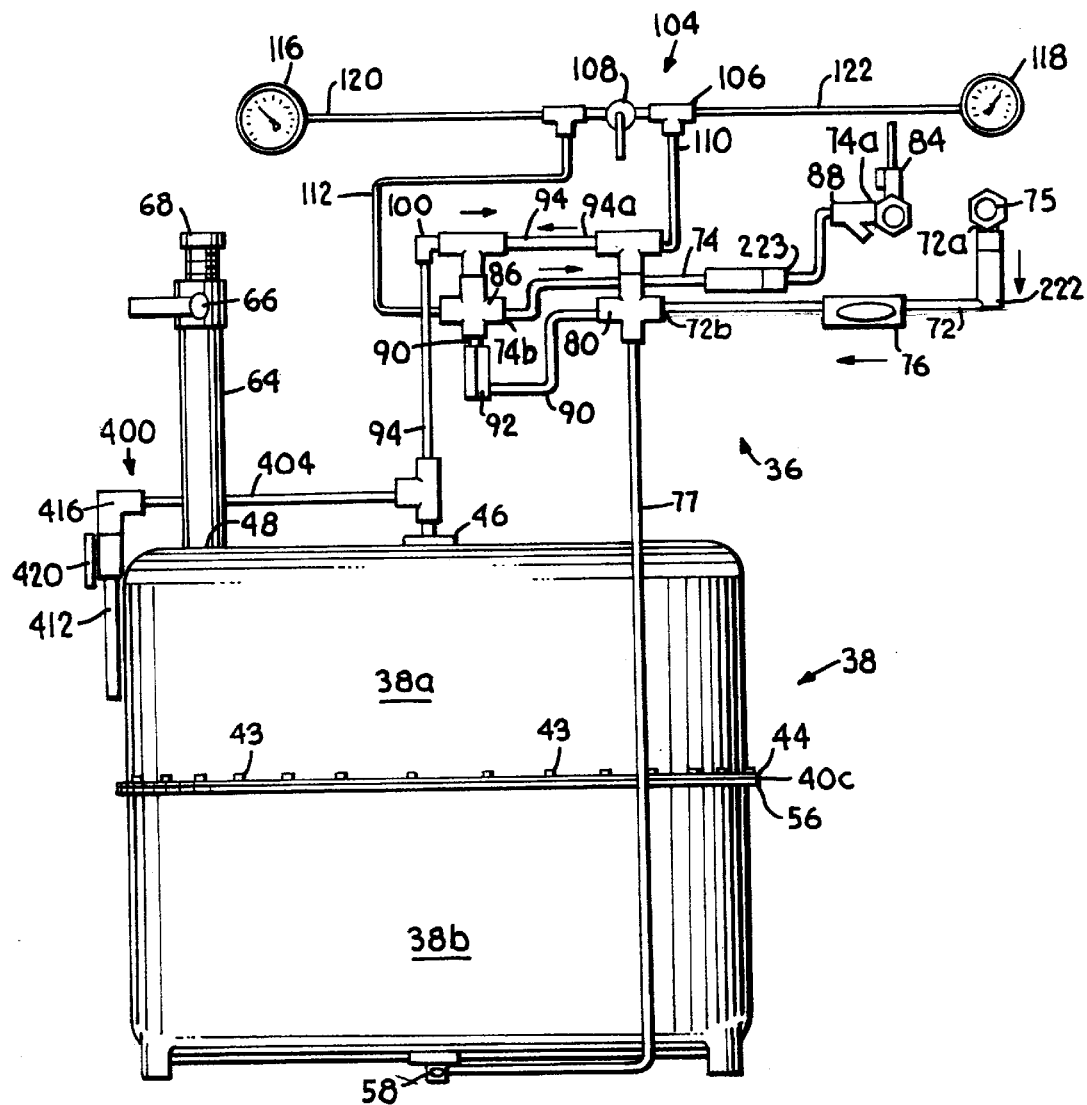
FIG. 20B is a schematic diagram of the conduit and control assembly of FIG. 20A including a pair of safety (pressure) regulators and a vent valve assembly.
Figure 30:
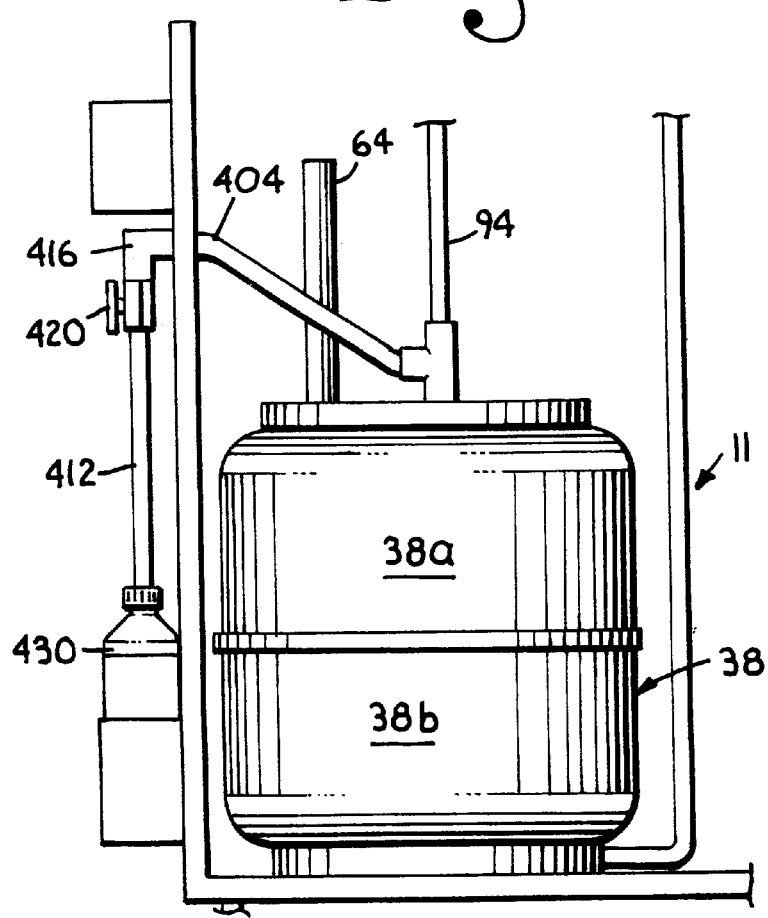
FIG. 30 is a front elevational view of the tank or cylinder having a vent valve assembly operatively engaged thereto.

Vent valve assembly 400 comprises a conduit 404 which communicatively connects to a conduit (identified as "94" below). Vent valve assembly 400 also includes a conduit 412 which couples to the conduit 404 through an elbow member 416. A vent valve 420 is disposed in, or provided with, conduit 412 (see FIGS. 1D and 10B by way of example only) such as to provide a means for venting tank 38, more specifically compartment 38a. A container 430 (see FIGS. 1D and 30) is conveniently placed in communication with conduit 412 to receive fluids from compartment 38a during a venting operation which will be further described below. As illustrated in FIG. 20B, vent valve 420 is opened when new ATF 50 is being poured down tube 64 for replenishing tank 38 with new ATF 50.

Pressure regulators 222 and 223 may be any suitable pressure regulator which is capable of accomplishing the purpose for which the regulators 222 and 223 are employed. A suitable pressure regulator has been found to be that purchased under the trade name Dixon 80 PSI Inline Regular No. 12080 to Dixon Corporation of 80 High Street, Chesterton, Md. 21620. The pressure regulators 222 and 223 are to be distinguished over a fluid flow regulator which regulates fluid flow such that when the flow of fluid ceases, there is still maximum pressure downstream of the fluid flow regulator. For pressure regulators, when the flow of fluids stops there is only the allotted pressure downstream thereof.

A conduit 90 interconnects multi-outlet joint 80 with 4-way outlet joint 86 and contains a by-pass regulator 92. Conduit 94 interconnects the port or opening 46 of compartment 38a with multi-outlet joint 80 and includes a control valve 100 for directing the flow of ATF within the conduit 94 and within control assembly 36 in general. As previously indicated for the embodiment of the invention shown in FIGS. 10B, 17B, 18B, 19B, 20B, 21B and 22A–25B, conduit 94 also communicatively connects to conduit 404 of the vent valve assembly 400. The portion of the conduit 94 extending from the multi-outlet joint 80 to the control valve 100 is illustrated as conduit 94a. The control valve 100 engages and communicates with 4-way outlet joint 86 as shown in FIGS. 10A and 10B.

The conduit and control assembly 36 has a pressure indicator assembly, generally illustrated as 104, which includes a conduit 106 with a pressure release valve 108. Line 110 and 112 connect from the conduit 106 to multi-outlet joint 80 and 4-way outlet joint 86 respectively. The pressure indicator assembly 104 further includes gauges 116 and 118 that connect to and communicate with conduit 106 via lines 120 and 122 respectively.

A recharge adapter 200 is provided for recharging the apparatus 10 as best shown in FIGS. 20A, 21A, 25A, 26 and 27. The recharge adapter 200 is releasably connected to outlet/spigot 84 and includes adapter end 200a and a vent valve 202. For one of the embodiments of the present invention as shown in FIGS. 20A, 21A and 26, the recharge adapter 200 includes a pressure regulator 222A which is similar to the pressure regulator 222 (see FIG. 26). For the embodiment of the invention illustrated and exemplified in FIGS. 22A–25A and 27, the pressure regulator 222A is not needed with the recharge adapter 200 since pressure regulators 222 and 223 have been disposed communicatively in conduits 72 and 74 respectively. For the embodiment of the invention shown in FIGS. 1D, 25B, 28, and 29, recharge adapter 300 has replaced recharge adapter 200.

In a preferred embodiment of the present invention, before used ATF 60 is withdrawn from the transmission 12 with the apparatus 10, a chemical cleaning compound is added to the used ATF 60 which is then flushed through the transmission 12 and its associated control circuits (e.g. the valve body assembly, the torque converter, the transmission cooler, etc.). The chemical cleaning compound may be added to the used ATF 60 by pouring a desired quantity of the chemical cleaning compound down a transmission fill tube (not shown in the drawings). Flushing the mixture of the chemical cleaning compound and used ATF 60 throughout the transmission 12 and its associated control circuits is accomplished by running the engine or driving the vehicle.

The chemical cleaning compound of the present invention for cleaning an automotive transmission along with its associated control circuits comprises a solvent, a fatty acid and a naphthenic hydrocarbon (i.e. naphtha). Preferably, the chemical cleaning compound comprises from about 1.0% by wt. to about 10.0% by wt. of a solvent; from about 1.0% by wt. to about 10.0% by wt. of a fatty acid; and from about 70.0% to about 98.0% by wt. of a naphthenic hydrocarbon. More preferably, the chemical cleaning compound comprises from about 4.0% by wt. to about 6.0% by wt. of a fatty acid; and from about 86.0% by wt. to about 94.0% by wt. of a naphthenic hydrocarbon. Most preferably, the chemical cleaning compound of the present invention comprises about 5.0% by wt. of a solvent; about 5.0% by wt. of a fatty acid; and about 90.0% by wt. of a naphthenic hydrocarbon.

The solvent for the present invention is preferably an alcohol. The alcohol may be any suitable alcohol that is capable of assisting in the cleaning function of the chemical cleaning compound. More preferably, the alcohol has the following chemical formula:

$$(R)_2CHCH_2CH(CH_3)OH$$

wherein R is an alkyl having from 1 to 3 carbon atoms, preferably 1 carbon atom. Most preferably, the alcohol is 2-methyl pentanol (methyl amyl alcohol), which may be purchased commercially from Shell Oil Company under the product name of Methyl Isobutyl Carbinol.

The fatty acid for the present invention is preferably a monounsaturated fatty acid. The monounsaturated fatty acid may be any suitable monounsaturated fatty acid that is capable of assisting in the cleaning function of the chemical cleaning compound. More preferably, the monounsaturated fatty acid has the following chemical formula:

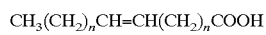

$$CH_3(CH_2)_nCH=CH(CH_2)_nCOOH$$

wherein n is an integer varying from about 5 to about 9, preferably n is an integer having the value of 7. Thus, most preferably, the monounsaturated fatty acid is cis-9-octadecenoic acid (oleic acid), which may be purchased commercially from Harcros Chemicals, Inc. of Kansas City, Kans. under the product name of Oleic Acid 105.

The naphthenic hydrocarbon for the present invention is preferably a naphthenic mixture comprising from about 55% by wt. to about 85% by wt. of petroleum naphtha (hydrotreated light naphthenic distillates) and from about 15% by wt. to about 45% by wt. of heavy naphtha (hydrotreated heavy naphthenic distillates). More preferably, the naphthenic mixture comprises from about 65% by wt. to about 75% by wt. of petroleum naphtha and from about 25% by wt. to about 35% by wt. of heavy naphtha, most preferably about 70% by wt. of petroleum naphtha and about 30% by wt. of heavy naphtha. Petroleum naphtha is typically a generic term that is applied to refined, partly refined, or unrefined, petroleum products and liquid products of natural gas not less than about 10% by wt. of which distill below about 347° F. (or about 175° C.) and not less than about 95% by wt. of which distill below about 464° F. (or about 240° C.) when subjected to distillation in accordance with the Standard Method of Test for Distillation of Gasoline, Naphtha, Kerosene, and similar Petroleum Products (ASTM D 86). The petroleum naphtha typically has a boiling point ranging from about 90° C. to about 220° C., an auto ignition temperature greater than about 200° C., and a specific gravity ranging from about 0.75 to about 0.85. Heavy naphtha (high-flash naphtha) is typically derived from coal-tar by fractional distillation and has a boiling point ranging from about 160° C. to about 250° C., an auto ignition temperature greater than about 260° C., and a specific gravity ranging from about 0.85 to about 0.98. The naphthenic hydrocarbon for the present invention is preferably a naphthenic mixture of the petroleum naphtha and the heavy naphtha such that the naphthenic mixture has the following properties: a flash point ranging from about 130° C. to about 180° C. (preferably from about 150° C. to about 165° C.); an autoignition temperature greater than about 260° C.; a boiling point ranging from about 230° C. to about 250° C. (preferably from about 235° C. to about 254° C.); from about 0.85 to about 0.95 (preferably about 0.87 to about 0.91); and a pour, congealing or melting point ranging from about −30° C. to about 5° C. (preferably from about −15° C. to about −20° C.). The naphthenic hydrocarbon is available commercially from the Exxon Company USA under the product name 105 Coastal Pale having a product category of a petroleum lubricating oil base stock with a clear liquid, light yellow color.

In a preferred embodiment of the present invention the chemical cleaning compound comprises about 90% by wt. of the naphthenic hydrocarbon; about 5% by wt. of oleic acid; and about 5% by wt. of methyl amyl alcohol. Stated alternatively, the chemical cleaning compound for the present invention comprises about 90% by wt. of the naphthenic hydrocarbon having the product name 105 Coastal Pale from the Exxon Company USA; about 5% by wt. of the oleic acid having the product name Oleic Acid 105 from the Harcros Chemicals Inc.; and about 5% by wt. of the methyl amyl alcohol having the product name Methyl Isobutyl Carbinol from the Shell Oil Company.

Figure 1C:
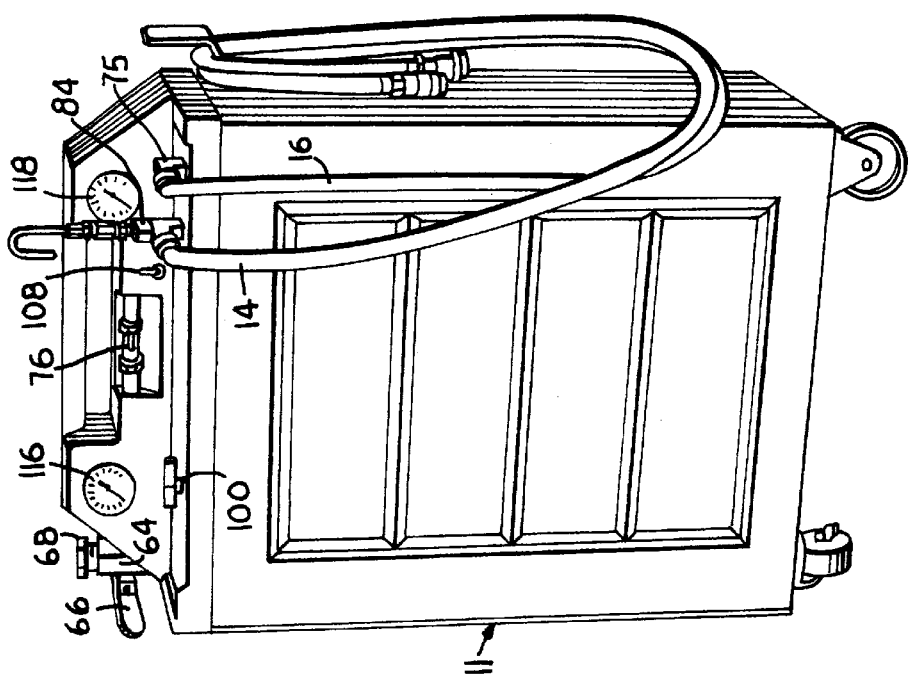
FIG. 1C is a perspective view of the cabinet that houses the apparatus of the present invention.

New ATF 50 leaves the tank 38, more specifically the compartment 38a, and passes through port 46 and into conduit 94. Valve 66 in tube 64 is presently closed. Vent valve 420 of the vent valve assembly 400 is also presently closed. New ATF 50 flows through conduit 94 to control valve 100 (i.e. a three-way ball valve) labeled "CHECK FLOW DIR/STOP" and "PROCESS/RECHARGE" (see FIGS. 1C and 1D). When the control valve 100 is in the "CHECK FLOW DIR/STOP" position, the used ATF 60 from the vehicle's transmission 12 passes through the flow indicator 76 (i.e. a sight glass) located on the cabinet 11 (see FIGS. 1C and 1D again) of the apparatus 10 so the technician or operator of the apparatus 10 may determine the direction of flow of the used ATF 60. If the flow is not in the proper direction for making the transfusion or displacement of ATF, then the connections of the hoses 14 and 16 to connector 75 and outlet/spigot 84 respectively must be reversed before proceeding further with the transfusion. Alternatively, hoses 14 and 16 may be disconnected from the wrong accessible points along the ATF route 18 and connected to the correct accessible points to obtain proper flow of used ATF 60.

The control valve 100 may also be placed in the "CHECK FLOW DIR/STOP" (see FIGS. 1C and 1D) position at any time the operator wishes to terminate the transfusion process. In the "PROCESS/RECHARGE" position, the control valve 100 has two (2) functions. This is the position where the transfusion takes place, allowing used ATF 60 to enter the tank 38 at port 58 and new ATF 50 to leave the tank 38 through port 46. Also in the "PROCESS/RECHARGE" position, the apparatus 10 can be recharged with new ATF 50 (see FIGS. 20A–21B, and 24A–25B) which automatically expels the used ATF 60 it has stored since the last service.

After the new ATF 50 leaves the control valve 100, it enters the 4-way outlet joint 86 that is coupled from one of its associated legs to the inlet side of the conduit 106 and pressure release valve 108 by line 112. Release valve 108 is used to relieve pressure accumulated during the recharging process. As previously indicated, another associated leg of the 4-way outlet joint 86 is coupled to the by-pass regulator 92, and the pressure relief valve 108 is coupled to gauge 116 by line 120. During the transfusion process, gauge 116 will typically register 10–30 p.s.i. depending on the make, model and condition of the transmission 12. When the transfusion is complete, gauge 116 will either register "0" p.s.i. or, depending on the type and condition of the transmission 12, it may register approximately "20" p.s.i. below gauge 118.

New ATF 50 leaves the 4-way outlet joint 86 through conduit 74 and subsequently passes through strainer/filter 88 and on to the outlet/spigot 84 on the cabinet 11 that houses the apparatus 10. For the embodiment of the invention exemplified in FIGS. 22A–25B, new ATF 50 also passes through pressure regulator 223 which is within conduit 74 as previously indicated. Outlet/spigot 84 includes a spigot that may be used for the removal of ATF to make room for any chemicals that may be added to the new ATF 50. New ATF 50 leaves outlet/spigot 84 and passes into hose 14 for passage into the transmission 12. Appropriate couplers (not shown) may be employed in the present invention, such as to make the actual connection of the hose 14 to the outlet/spigot 84. As previously mentioned, the tube 64 is attached to the new fluid side of the tank 38 and protrudes through the top of the cabinet 11. Tube 64 has the valve 66 to open the tube 64 for manual filling the tank 38. At all other times, the valve 66 is closed. The cap 68 on top of the tube 64 is to prevent dirt and dust from entering the tank 38 through the tube 64. New ATF 50 does not pass through the bypass regulator 92 and into conduit 90 for admixing with used ATF 60 since the bypass regulator 92 is not opened. As will be further stated below, pressure regulator 92 does not open to allow passage of ATF therethrough unless a prescribed pressure differential occurs on opposite sides of the pressure regulator 92. When new ATF 50 is flowing simultaneously with the flowing of used ATF 60, there is essentially no major discernible pressure differential on opposite sides of the pressure regulator 92.

Used ATF 60 is routed into the apparatus 10 by means of special connectors (not shown) designed to either fit on the loosened end of hose 16 or at any other suitable location. These adapters are fitted with male quick connects that snap into a length of the hose 16 that runs to the connector 75 on the cabinet 11 that houses the apparatus 10.

After passing through connector 75 and into the conduit 72, the used ATF 60 flows through the flow indicator 76 which is used to determine direction of fluid flow. For the embodiment of the invention exemplified in FIGS. 22A–25B, used ATF 60 flows through the pressure regulator 222 before passing through the flow indicator 76. From the flow indicator 76 the used ATF 60 flows to the multi-outlet joint 80 that connects to the bottom of the tank 38 via conduit 77. When the tank 38 is full of used ATF 60, the incoming fluid (which now would essentially be new ATF 50) is routed from this junction (i.e. multi-outlet joint 80) through the bypass regulator 92, through the 4-way outlet joint 86, through conduit 74 and hose 14, and back to the transmission 12.

The bypass regulator 92 is preset and is typically not an operator adjustable item. Bypass regulator 92 activates only when a predetermined pressure differential (preferably approximately 20 p.s.i.) exists on opposite sides of the bypass regulator 92; that is the difference in the pressure on the 4-way outlet joint 86 side of conduit 90 from the pressure on the multi-outlet joint 80 side of conduit 90. In a preferred embodiment of the present invention this condition occurs when the used ATF side (i.e. compartment 38b) of the tank 38 is full. Bypass regulator 92 allows the system to operate safely even when the technician or operator is not available to shut down the system. As indicated, the fluid coming from the transmission 12 by this time will be new dean fluid (i.e. new ATF 50) and this fluid simply bypasses the conduit 77 and the tank 38 and flows through the multi-outlet joint 80, through conduit 90 including bypass regulator 92, through 4-way outlet joint 86, and through conduit 74 including strainer/filter 88, and back into the transmission 12 via hose 14. For the embodiment of the invention depicted in FIGS. 22A–25B, bypassing new ATF 50 would flow through the pressure regulator 223 before passing through the strainer/filter 88. The system can essentially operate in this mode indefinitely.

As previously indicated, the multi-outlet joint 80 is coupled to the inlet side of the conduit 106 and pressure release valve 108 through line 110. The conduit 106 and pressure relief valve 108 are coupled to the gauge 118 via line 122. During the transfusion process, gauge 118 will read almost identical to pressure gauge 116. When the transfusion process is complete, gauge 118 may read up to 20 p.s.i. above gauge. As stated above, multi-outlet joint 80 is also coupled to the control valve 100 (i.e. the valve labeled "CHECK FLOW DIR/STOP" and "PROCESS/RECHARGE") by conduit 94a. Conduit 94a is active only when the flow direction is being checked or when the transfusion process needs to be stopped for any reason.

Continuing to refer in detail now to the drawings for operation of the invention and the process for cleaning the transmission 12 (and its associated circuits or components) and for replacing used ATF 60 in the transmission 12 with new ATF 50, the engine of a vehicle is started and is run until normal operating temperature is reached. The ATF level of the automatic transmission is checked and is adjusted as necessary to hold a desired quantity (e.g. 10–14 ounces per four (4) gallons of used ATF 60) of the chemical cleaning compound. The chemical cleaning compound is admixed with the used ATF 60 by pouring the desired quantity of the chemical cleaning compound down the transmission fill tube. The engine is run or the vehicle is driven for at least 5 minutes, but preferably no more than 30 minutes. For maximum cleaning, the vehicle will preferably be driven during this time, but if the vehicle can not be driven, then it should be placed on a lift where the wheels of the vehicle are off the floor. With the engine running, the transmission 12 is shifted through all the gears to be sure the valve body in the transmission 12 is actuated and to insure that the chemical cleaning compound gets to all parts of the associated components of the transmission 12. During this procedure, the brake is fully applied between gear changes to prevent damage to the transmission 12 or differential assemblies.

The transmission 12 of the vehicle is now ready for the transfusion (i.e. for the removal of used dirty ATF 60 and installation of new clean ATF 50 in the transmission 12, valve body, torque converter, transmission lines, and ATF cooler(s)). The engine is shut down and a junction is located at any accessible point along the ATF route 18 (see FIGS. 2–9) that will allow the operator to install one of the included connectors (not shown) to each end of the junction. Subsequently, the hoses 14 and 16 are respectively attached to the outlet/spigot 84 and to connector 75 on the cabinet 11 of the apparatus 10. It is not necessary to know for certain which way the ATF is flowing at this time. The other available end of hose 16 is connected to the aforementioned appropriate adapter located at an accessible point along the ATF route 18.

The next step is to check the direction of flow of the ATF through the lines. To accomplish this, the control valve 100 on top of the cabinet 11 is turned to "CHECK FLOW/STOP." The vehicle's engine is started and the direction of ATF flow in the flow indicator 76 on the cabinet 11 is detected. If the ATF flow is in the wrong direction, the engine is shut off and the hoses 14 and 16 at the quick connect fittings (where the hoses 14 and 16 respectively connect to outlet/spigot 84 and connector 75) are reversed. The engine is restarted and the control lever 100 (see FIGS. 18A and 18B) is fumed to "PROCESS/RECHARGE." The transmission's own pump will begin the transfusion immediately by pumping the used ATF 60 into the collapsed compartment (i.e. compartment 38b) of the tank 38. This instantly exerts pressure on surface 40a of the bladder 40 and on the new ATF 50, which forces new ATF 50 out from compartment 38a through the conduit 94, through control valve 100, through 4-way outlet joint 86, through conduit 74 and through hose 14 and into the transmission 12 at the same rate of flow and pressure that used ATF 60 is being pumped into the tank 38. This means that the level of fluid in the transmission and components remains the same at all times during the transfusion. The fluid level in the transmission 12 does not require constant monitoring.

As the transmission 12 continues to pump used ATF 60 into the tank 38, the bladder 40 is collapsed against the other side (i.e. surface 42 of the compartment 38a) and pressure may begin to build in the used ATF side of the apparatus 10, depending on the placement of the transmission's own internal regulator. The preset bypass regulator 92 in the used ATF side of the apparatus will open when a 20 p.s.i. differential exists between the pressure on the new ATF side and the pressure on the used ATF side. Incoming fluid which is now new clean ATF 50 will be routed around the tank 38 as previously indicated and back into the transmission 12. At this point the transfusion itself is complete, some four to eight minutes after it began. The operator will know when the transfusion is complete because there is now about a 20 p.s.i. differential in the pressure readings on the gauges 116 and 118. When the transfusion is complete, the engine is shut off and the previously installed connections are removed. Subsequently, the operator reconnects the transmission hose, starts the engine and checks the transmission fluid level.

The tank 38 in the apparatus 10 must be recharged with new ATF 50 before the next service. It can be recharged easily and quickly from any ATF source, and with any factory specification ATF required by the next vehicle to be serviced. Recharging the apparatus 10 discharges the captured used ATF 60 from the last service, making the invention even more simple and "user friendly." To recharge the apparatus 10, the control valve 100 is turned to "PROCESS/RECHARGE." A special connector (not shown but is any open end adapter) is attached to an end of the used ATF hose (i.e. hose 16) which is subsequently placed in a used oil receptacle (not shown). Next, the new ATF hose (i.e. hose 14) is removed from the outlet/spigot 84 and the recharge adapter 200 is connected directly onto the outlet/spigot 84 protruding from the cabinet 11. For the embodiment of the invention illustrated for example in FIGS. 10A, 17A, 18A, 19A, 20A and 21A, the recharge adapter 200 contains the pressure regulator 22A (see FIG. 26) to prevent unnecessary pressure from being applied to the tank 38. For the embodiment of the invention illustrated and exemplified in FIGS. 22A–25A, no pressure regulator 222A is connected to recharge adapter 200 as best shown in FIG. 27. In another preferred embodiment of the invention and after removing hose 14 from outlet/spigot 84, recharge adapter 300 (instead of recharge adapter 200) is connected directly onto the outlet/spigot 84 extending upwardly from the cabinet 11 (see FIGS. 1C and 1D). Recharge adapter 300 contains no vent valve, such as vent valve 202 on recharge adapter 200. When the recharge adapter 300 is employed in the present invention, the vent valve assembly 400 is also preferably employed.

In the embodiment of the invention employing the recharge adapter 200, after the recharge adapter 200 is installed to outlet/spigot 84 and after the vent valve 202 (see FIGS. 20A and 26) of the recharge adapter 200 closed, shop air is applied into the end 200a of the recharge adapter 200 until the pressure reading on gauge 118 reads "0". In the embodiment of the invention employing recharge adapter 300, after the recharge adapter 300 is installed to outlet/spigot 84 and with the vent valve 420 of the vent valve assembly 400 closed, shop air is applied to check valve end of the recharge adapter 300 until the pressure reading on gauge 118 reads "0". Pressurized air flows through conduit 74, through 4-way outlet joint 86, through control valve 100, through conduit 94 and into the compartment 38a to exert air pressure against surface 40a of the bladder 40 to commence the expulsion of used ATF 60 through conduit 77 (see FIGS. 19A and 19B), through multi-outlet joint 80, through conduit 72 and out of connector 75 into hose 16. As previously indicated, gauge 118 is capable of detecting the pressure in multi-outlet joint 80 (including conduit 94a and conduit 77) through communication with the multi-outlet joint 80 with line 122, conduit 106, and line 110. A "0" reading on gauge 118 indicates that all used ATF 60 has been expelled and that the bladder 40 (see FIG. 12) is collapsed against the bottom of the tank 38 (i.e. against the surface of the internal wall 54 of compartment 38b) and is now ready for manual filling. To release any trapped pressure from the new ATF compartment (i.e. compartment 38a) of the tank 38, the pressure relief valve 108 in conduit 106 is opened. For the embodiment of the present invention employing recharge adapter 200, the vent valve 202 on the bottom of the recharge adapter 200 is opened. As previously indicated and in the embodiment of the invention employing the recharge adapter 300 and the vent valve assembly 400, vent valve 420 is opened. This will allow air to escape from the tank 38 as it is being filled. Next, cap 68 is removed off of tube 64 and valve 66 is slowly opened. A desired quantity (e.g. approximately four gallons) of new ATF 50 is poured down tube 64 to fill the tank 38 including compartment 38a. When the desired level of new ATF 50 is attained, valve 66 is closed and cap 68 is replaced over tube 66. Subsequently and for the embodiment employing recharge adapter 200, the operator is to close the vent valve 202, remove the recharge adapter 200 and special connectors (not shown), and reconnect the new ATF service hose (i.e. hose 14). For the embodiment of the invention using the recharge adapter 300 and the vent valve assembly 400, the operator subsequently closes vent valve 420 of the valve assembly 400 after cap 68 has been replaced over tube 66; and then the operator removes the recharge adapter 300, and subsequently reconnects the new ATF service hose (i.e. hose 14).

For pressurized filling (see FIGS. 21A and 21B), adapters are connected the same way as for manual filling. If the recharge adapter 200 is being used, pressurized new ATF 50 is applied into end 200a of the recharge adapters 200 with its associated vent valve 202 closed and tank 38 including compartment 38a is filled with new ATF until gauge 118 reads approximately "0". If the recharge adapter 300 and the vent valve assembly 400 is being employed, pressurized new ATF 50 is applied into the check valve end of the recharge adapter 300 with vent valve 420 of the vent valve assembly 400 closed, and tank 38 including compartment 38a is filled with new ATF until gauge 118 reads approximately "0". This reading indicates all used ATF 60 has been expelled and the tank 38 is now filled with new ATF 50. The pressure relief valve 108 in conduit 106 is opened to relieve any pressure trapped in the new ATF side of the apparatus 10. Any pressure in the used ATF side of the apparatus 10 is vented back into the used ATF hose (i.e. hose 16) and on the used ATF storage tank (not shown). Recharging is now complete and the transfusion apparatus 10 is ready for the next vehicle service.

Thus, by the practice of the present invention there is provided an economical system for both cleaning and flushing automatic transmissions 12. For use in normal schedule transmission service there is no need to remove the transmission pan or filter, thus saving parts, cost and labor. The simplicity of the design of the apparatus 10 itself results in low initial equipment cost. There is no power in the apparatus 10, which means no scheduled maintenance is required. Furthermore, there are no extra batteries to purchase in order to use the system. Some prior art devices use 3–4 times the normal capacity of ATF to insure a good exchange. With normal capacity being 8–12 quarts, that equates to as much as 12 gallons of ATF to exchange a 3 gallon system. The practice of the present invention particularity addresses this needed improvement and will reach the same range of purity with 4 gallons or less. This represents a significant savings in materials. The apparatus 10 in the process mode will make the ATF exchange in 3 to 7 minutes on average, depending on the make, model and condition of the transmission 12, making it as quick as any system and faster than most. Time equals money in a service center.

Practice of the present invention enables the operator to change types of ATF from service to service to accommodate the particular type required by each make or model of vehicle. Prior art devices make use of 10–15 gallon storage tanks, thus each transmission serviced will get the same ATF, regardless of the specs required by the manufacturer. Misapplication is encouraged by these prior art designs. The apparatus 10 can be easily recharged with new ATF 50, and discharge captured used ATF 60 in under 2 minutes, again making it fast and economical.

Thus, while the present invention has been described herein with reference to particular embodiments thereof, a latitude of modification, various changes and substitutions are intended in the foregoing disclosure, and it will be appreciated that in some instances some features of the invention will be employed without a corresponding use of other features without department from the scope of the invention as set forth.

We claim:

1. A process for cleaning an automatic transmission and for replacing after cleaning contaminated used transmission fluid in the automatic transmission with fresh automatic transmission fluid comprising the steps of:

a) flowing fresh automatic transmission fluid into a first container member and into a pliable tub member in communication with the first container member until the pliable tub member and the first container member are filled with a volume of fresh automatic transmission fluid;

b) disposing a chemical cleaning compound in an automatic transmission containing used automatic transmission fluid;

c) circulating the chemical cleaning compound of step (b) through the automatic transmission to clean the automatic transmission and produce contaminated used automatic transmission fluid;

d) flowing with a pressure the contaminated used automatic transmission fluid of step (c) from the automatic transmission into a second container member in communication with the pliable tub member of step (a), causing the fresh automatic transmission fluid of step (a) to flow from the first container member and from the pliable tub member into the automatic transmission; and e) regulating the pressure of the flowing step (d) to ensure at the flowing contaminated used automatic transmission fluid does not exceed a prescribed pressure.

2. The process of claim 1 wherein said flowing of step (d) continues until the second container member and the pliable tub member are filled with a volume of contaminated used automatic transmission fluid and the automatic transmission contains the fresh automatic transmission fluid.

3. The process of claim 2 wherein said volume of fresh automatic transmission of step (a) is approximately equal to said volume of contaminated used automatic transmission fluid.

4. The process of claim 3 additionally comprising removing fresh automatic transmission fluid from the automatic transmission; flowing the removed fresh automatic transmission fluid through a bypass member; and recycling the removed fresh automatic transmission fluid back into the automatic transmission.

5. The process of claim 2 additionally comprising removing fresh automatic transmission fluid from the automatic transmission; flowing the removed fresh automatic transmission fluid through a bypass member; and recycling the removed fresh automatic transmission fluid back into the automatic transmission.

6. The process of claim 1 additionally comprising removing fresh automatic transmission fluid from the automatic transmission; flowing the removed fresh automatic transmission fluid through a bypass member; and recycling the removed fresh automatic transmission fluid back into the automatic transmission.

7. The process of claim 1 wherein said chemical cleaning compound comprises a solvent, a fatty acid, and a naphthenic hydrocarbon.

8. The process of claim 1 wherein said chemical cleaning compound comprises from about 1.0% by wt. to about 10.0% by wt. 2-methyl-1-pentanol; from about 1.0% by wt. to about 10.0% by wt. cis-9-octadecenoic acid; and from about 70.0% by wt. to about 98.0% by wt. of a naphthenic hydrocarbon.

9. A process for replacing used transmission fluid in an automatic transmission with fresh automatic transmission fluid comprising the steps of:

a) flowing used automatic transmission fluid with a pressure from an automatic transmission into a container member, causing fresh automatic transmission fluid to flow from the container member into the automatic transmission;

b) regulating the pressure of the flowing used automatic transmission fluid such that the pressure does not exceed a prescribed pressure;

c) removing fresh automatic transmission fluid from the automatic transmission to produce removed fresh automatic transmission fluid;

d) flowing the removed fresh automatic transmission fluid of step (c) through a bypass member; and e) recycling the removed fresh automatic transmission fluid back into the automatic transmission.

10. The process of claim 9 wherein said flowing step (a) comprises moving a pliable tub member from a first position of being essentially flushed against a first internal wall of the container member to a second position of being essentially flushed against a second internal wall of the container member.

11. A process for removing used automatic transmission fluid from an automatic transmission and replacing in the automatic transmission the removed used transmission fluid with fresh automatic transmission fluid comprising the steps of:

a) providing a container member having a first chamber with a first internal wall and a second chamber with a second internal wall and including a pliable tub member with a first tub side and with a second tub side and disposed in the container member such as to separate the first chamber from the second chamber;

b) disposing fresh automatic transmission fluid in the first chamber of the container member such that the second tub side of the pliable tub member becomes essentially flushed against the second internal wall of the second chamber;

c) flowing used automatic transmission fluid from an automatic transmission through a pressure regulator and into the second chamber of the container member, causing fresh automatic transmission fluid to flow out of the first chamber and into the automatic transmission as the second tub side of the pliable tub member moves away from the second internal wall of the second chamber; and d) continuing said flowing step (c) until said first tub side of said tub member becomes essentially flushed against the first internal wall of the first chamber.

* * * * *